(12) United States Patent
Miyauchi et al.

(10) Patent No.: US 7,740,987 B2
(45) Date of Patent: Jun. 22, 2010

(54) FUEL CELL COGENERATION SYSTEM, METHOD OF OPERATING

(75) Inventors: Shinji Miyauchi, Nara (JP); Tetsuya Ueda, Kasugai (JP); Yoshiaki Yamamoto, Katano (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/476,305

(22) Filed: Jun. 2, 2009

(65) Prior Publication Data

US 2009/0239108 A1 Sep. 24, 2009

Related U.S. Application Data

(63) Continuation of application No. 10/894,261, filed on Jul. 19, 2004, now abandoned.

(30) Foreign Application Priority Data

Jul. 23, 2003 (JP) .............................. 2003-278066

(51) Int. Cl.
*H01M 8/00* (2006.01)
*H01M 8/04* (2006.01)

(52) U.S. Cl. .................. 429/429; 429/428; 429/435

(58) Field of Classification Search ................ 429/24
See application file for complete search history.

(56) References Cited

U.S. PATENT DOCUMENTS

2002/0146608 A1 10/2002 Yang et al.
2003/0211373 A1* 11/2003 Ueda et al. ................ 429/24
2004/0209135 A1 10/2004 Wexel et al.
2005/0019628 A1 1/2005 Clark et al.

FOREIGN PATENT DOCUMENTS

| DE | 10 2004 016375 A1 | 10/2004 |
|----|-------------------|---------|
| JP | 2002-042841 A | 2/2002 |
| JP | 2002042846 A | 2/2002 |

OTHER PUBLICATIONS

Machine translation of JP 2002-042841 listed in Applicant's IDS.*

* cited by examiner

*Primary Examiner*—Patrick Ryan
*Assistant Examiner*—Ashley Kwon
(74) *Attorney, Agent, or Firm*—Panitch Schwarze Belisario & Nadel LLP

(57) ABSTRACT

A method of operating a fuel cell cogeneration system comprises the steps of cooling a fuel cell by circulating an internal heat transfer medium through the fuel cell while the fuel cell is generating electric power, storing an external heat transfer medium in a heat utilization portion, detecting remaining calories of the heat utilization portion by a first detector provided at the heat utilization portion, increasing a temperature of the fuel cell to an operating temperature by carrying out a first temperature increasing operation, and increasing the temperature of the fuel cell to the operating temperature by carrying out a second temperature increasing operation.

15 Claims, 16 Drawing Sheets

FUEL CELL COGENERATION SYSTEM, METHOD OF OPERATING

CROSS-REFERENCE TO RELATED APPLICATIONS

The present application is a Continuation of U.S. patent application Ser. No. 10/894,261, filed Jul. 19, 2004 and entitled "Fuel Cell Cogeneration System," the entire disclosure of which is here incorporated by reference.

BACKGROUND OF THE INVENTION

1. Field of the Invention

The present invention relates to a fuel cell cogeneration system.

2. Description of the Related Art

FIG. 16 is a block diagram showing a construction of the conventional fuel cell cogeneration system (see Japanese Laid-Open Patent Application Publication No. 2002-042841, page 3 to 6, FIG. 1).

Turning to FIG. 16, the fuel cell cogeneration system comprises a fuel cell 1 configured to generate an electric power using a fuel gas and an oxidizing gas, a fuel processor 2 configured to generate the fuel gas by subjecting a material to a steam reforming reaction and a shift reaction, a fuel-gas humidifier 5 configured to humidify the fuel gas to be supplied to the fuel cell 1, an air supply device 6 configured to supply air as the oxidizing gas to the fuel cell 1, and an oxidizing-gas humidifier 7 configured to humidify the air.

The fuel cell cogeneration system further comprises a cooling pipe 8 through which antifreezing fluid is sent to the fuel cell 1 to adjust a temperature of the fuel cell 1, a pump 9 configured to circulate cooling water, and a heat exchanger 12 configured to exchange heat generated in the fuel cell 1 with an external heat transfer medium (e.g., city water). With this construction, the external heat transfer medium which has exchanged heat with the fuel cell 1 flows in a direction and is stored in a heat utilization means 16 such as a tank that recovers heat from the fuel cell 1, and during start of the fuel cell 1, a heat transfer controller 17 flows the external heat transfer medium from the heat utilization means 16 to the fuel cell 1 in a reverse direction so that the heat recovered by the heat utilization means 16 is transferred to the fuel cell 1 through the heat exchanger 12.

Like the conventional fuel cell cogeneration system, the use of the hot water stored in the heat utilization means as the heat for heating the fuel cell 1 during start, is optimal in terms of reduction of the start time and energy use efficiency. However, since consumers typically consume hot water regardless of the amount of hot water remaining within the heat utilization means, the hot water may run out with use when the hot water stored in the heat utilization means is running short. Especially when the heat utilization means is not internally equipped with a backup hot water supply device for ensuring the hot water, consumers are incapable of consuming the hot water. This presents a serious inconvenience.

SUMMARY OF THE INVENTION

The present invention has been directed to solving the above described problem, and an object of the present invention is to provide a fuel cell cogeneration system capable of inhibiting hot water from running out and of improving convenience.

In order to the achieve the above described object, there is provided a fuel cell cogeneration system comprising: a fuel cell; a cooling system configured to circulate an internal heat transfer medium to allow the fuel cell to exchange heat with the internal heat transfer medium; a heater configured to heat the internal heat transfer medium; a heat utilization portion configured to store an external heat transfer medium to allow consumers to consume the external heat transfer medium; a heat utilization system configured to circulate the external heat transfer medium through the heat utilization portion to allow the internal heat transfer medium in the cooling system to exchange heat with the external heat transfer medium; a first detector configured to detect remaining calories in the heat utilization portion; and a controller, wherein at start of the fuel cell, the controller determines whether or not the detected remaining calories in the heat utilization portion are not less than a threshold which is not less than fuel cell temperature increasing calories required to increase a temperature of the fuel cell to an operating temperature, determines a ratio between a first temperature increasing operation and a second temperature increasing operation based on determination as to whether or not the detected remaining calories are not less than the threshold, the first temperature increasing operation being performed in such a manner that the remaining calories in the heat utilization portion are transferred to the internal heat transfer medium by heat exchange to increase the temperature of the fuel cell, and the second temperature increasing operation being performed in such a manner that the heater heats the internal heat transfer medium to increase the temperature of the fuel cell, and increases the temperature of the fuel cell to the operating temperature by both the first temperature increasing operation and the second temperature increasing operation or by either the first temperature increasing operation or the second temperature increasing operation.

The controller may increase the temperature of the fuel cell to the operating temperature mainly by the first temperature increasing operation when the remaining calories are not less than the threshold, and may increase the temperature of the fuel cell to the operating temperature mainly by the second temperature increasing operation when the remaining calories are less than the threshold.

The fuel cell cogeneration system may further comprise: a second detector configured to detect a temperature of the external heat transfer medium stored in the heat utilization portion, wherein the controller may increase the temperature of the fuel cell to the operating temperature mainly by the second temperature increasing operation when the remaining calories are less than the threshold, and the controller may determine whether or not the detected temperature of the external heat transfer medium is not lower than the operating temperature when the remaining calories are not less than the threshold, may determine the ratio between the first temperature increasing operation and the second temperature increasing operation based on determination as to whether or not the detected temperature is not higher than the operating temperature, and may increase the temperature of the fuel cell to the operating temperature by both the first temperature increasing operation and the second temperature increasing operation or by either the first temperature increasing operation or the second temperature increasing operation.

The controller may increase the temperature of the fuel cell to the operating temperature mainly by the first temperature increasing operation when the temperature of the external heat transfer medium is not lower than the operating temperature, and may increase the temperature of the fuel cell to the operating temperature mainly by the second temperature increasing operation when the temperature of the external heat transfer medium is lower than the operating temperature.

The fuel cell cogeneration system may further comprise a third detector configured to detect ambient air temperature outside the fuel cell, wherein the controller may increase the temperature of the fuel cell to the operating temperature mainly by the first temperature increasing operation when the temperature of the external heat transfer medium is not lower than the operating temperature, and the controller may determine whether or not the temperature of the external heat transfer medium is not lower than the detected ambient air temperature when the temperature of the external heat transfer medium is lower than the operating temperature, may determine the ratio between the first temperature increasing operation and the second temperature increasing operation based on determination as to whether or not the temperature of the external heat transfer medium is not lower than the detected ambient air temperature, and may increase the temperature of the fuel cell by both the first temperature increasing operation and the second temperature increasing operation or by either the first temperature increasing operation or the second temperature increasing operation.

The controller may increase the temperature of the fuel cell to the operating temperature by using a combination of the first temperature increasing operation and the second temperature increasing operation when the temperature of the external heat transfer medium is not lower than the detected ambient air temperature, and may increase the temperature of the fuel cell to the operating temperature mainly by the second temperature increasing operation when the temperature of the external heat transfer medium is lower than the detected ambient air temperature.

The threshold may include the fuel cell increasing calories and predetermined calories, and the controller may increase the temperature of the fuel cell to the operating temperature mainly by the first temperature increasing operation when the remaining calories are not less than the threshold, and the controller may increases the temperature of the fuel cell to the operating temperature mainly by the second temperature increasing operation when the remaining calories are less than the threshold.

The predetermined calories may be start time period consumed calories assumed to be consumed by consumers during a start time period from when the fuel cell starts until a predetermined time elapses.

The fuel cell cogeneration system may further comprise: a fourth detector configured to detect consumed calories of the external heat transfer medium stored in the heat utilization portion; a clock configured to measure time; and a storage configured to store the detected consumed calories and the measured time, wherein the controller may calculate the start time period consumed calories based on the measured time and the stored consumed calories.

The controller may obtain the start time period consumed calories by calculating an average value of consumed calories for a predetermined period.

The predetermined calories may include a fixed amount and a correction amount, and the controller may change the correction amount based on the calculated start time period consumed calories.

The fuel cell cogeneration system may further comprise a fifth detector configured to detect ambient air temperature outside the fuel cell, wherein the controller may change the predetermined calories based on the detected ambient air temperature.

The fuel cell cogeneration system may further comprise: a sixth detector configured to detect a temperature of the consumed external heat transfer medium, wherein the controller may change the predetermined calories according to a frequency at which the detected temperature of the external heat transfer medium is not higher than a predetermined value.

The external heat transfer medium may be water, and the heat utilization portion may be a tank.

The tank may be a layered hotwater tank.

The controller may increase the temperature of the fuel cell to the operating temperature only by the first temperature increasing operation when the remaining calories are not less than the threshold, and may increase the temperature of the fuel cell to the operating temperature only by the second temperature increasing operation when the remaining calories are less than the threshold.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings.

Embodiment 1

Figure 1:
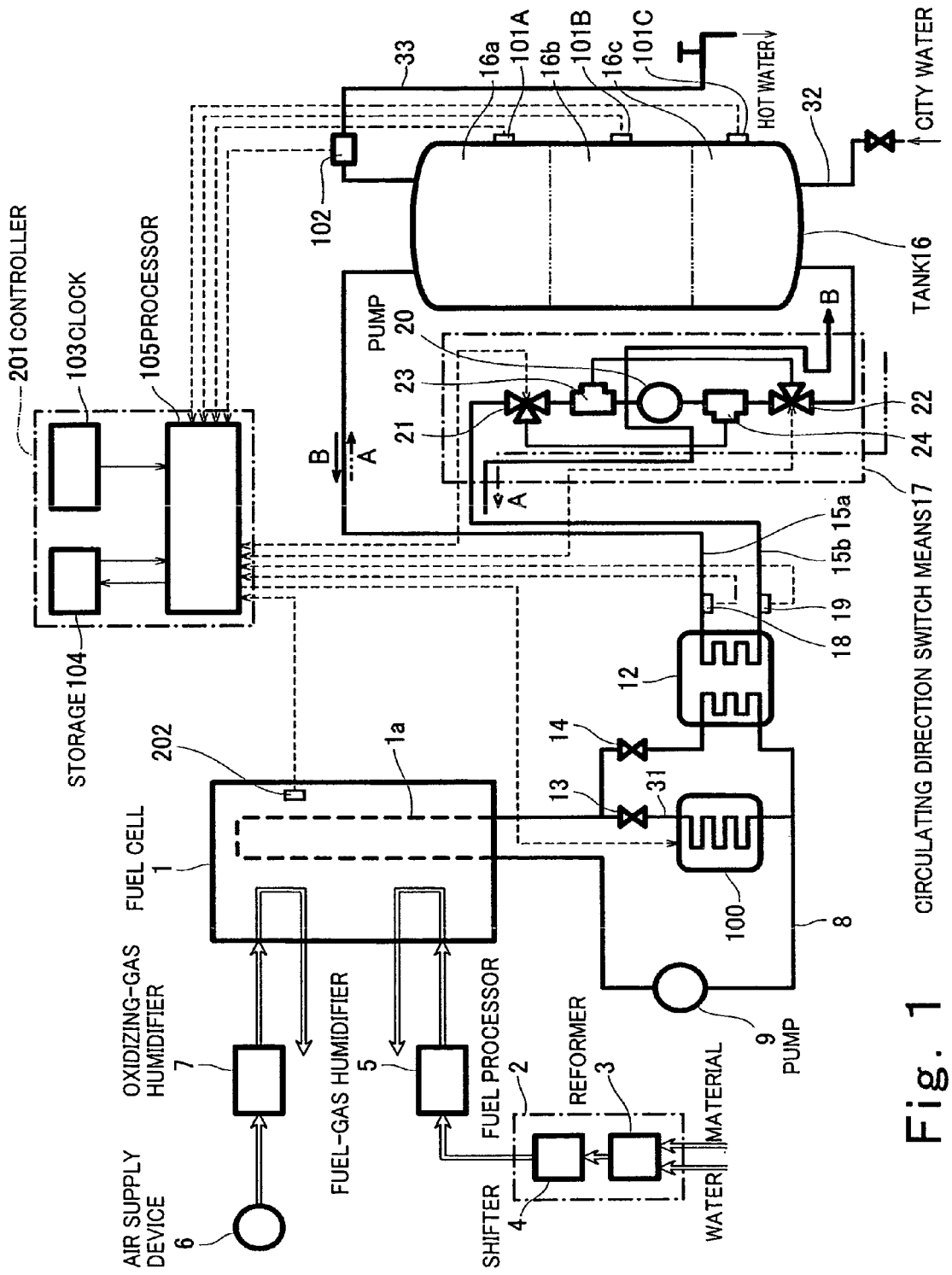
FIG. 1 is a block diagram showing a construction of a fuel cell cogeneration system according to a first embodiment of the present invention.

FIG. 1 is a block diagram showing a construction of a fuel cell cogeneration system according to a first embodiment of the present invention.

Turning to FIG. 1, the fuel cell cogeneration system (hereinafter simply referred to as cogeneration system) is chiefly divided into a construction of hardware and a configuration of a control system.

First of all, the construction of the hardware will be described. The cogeneration system comprises a fuel cell 1 configured to generate an electric power using a fuel gas and an oxidizing gas, a fuel processor 2 configured to generate a fuel gas from a material and water and to supply the fuel gas to the fuel cell 1, a fuel-gas humidifier 5 configured to humidify the fuel gas being supplied to the fuel cell 1 at a position in a flow path extending to the fuel cell 1, an air supply device 6 configured to supply air as an oxidizing gas to the fuel cell 1, and an oxidizing-gas humidifier 7 configured to humidify the air being supplied to the fuel cell 1 at a position in a flow path extending to the fuel cell 1. The fuel processor 2 includes a reformer 3 configured to generate the fuel gas through a steam reforming reaction of the material and a shifter 4 configured to shift the fuel gas.

The cogeneration system comprises a cooling system configured to cool the fuel cell 1 and a heat utilization system configured to utilize heat recovered in the cooling system.

The cooling system includes a cooling water pipe 8 having ends connected to an inlet and an outlet of a cooling water passage (hereinafter referred to as an inner passage) 1a of the fuel cell 1 and configured to allow the cooling water (e.g., antifreezing fluid) as an internal heat transfer medium to flow therethrough, a cooling water pump 9 provided in the cooling water pipe 8 and configured to circulate the cooling water, and a heat exchanger 12 provided in the cooling water pipe 8 and configured to exchange heat owned by the cooling water with an external heat transfer medium (e.g., stored hot water (city water)). The heat exchanger 12 has a pair of passages, one of which is connected to the cooling water pipe 8.

A pipe 31 is provided to connect portions of the pipe 8 which are located on both sides of the heat exchanger 12. A cooling water heater 100 configured to heat cooling water and a flow rate control valve 13 are provided in the pipe 31. A flow rate control valve 14 is provided at a position of the pipe 8 between a position where the pipe 31 is connected to the pipe 8 and the heat exchanger 12. The cooling water heater 100 is, for example, formed by a resistance heating type heater and configured to heat the cooling water by a current supplied from a power supply (not shown) connected to an electric power system.

The heat utilization system comprises a tank 16 as a heat utilization portion, a pair of pipes 15a and 15b, and a circulating direction switch means 17. The tank 16 employs a layered hotwater tank. The tank 16 is tubular and provided such that its center axis extends in a vertical direction. An upper end of the tank 16 is connected to one end of the other of the pair of passages of the heat exchanger 12 through a pipe 15a, and a lower end of the tank 16 is connected to the other end of the other of the passages of the heat exchanger 12 through a pipe 15b. And, the circulating direction switch means 17 is located in the pipe 15b.

The circulating direction switch means 17 includes a stored hot water pump 20 configured to circulate the external heat transfer medium, a discharge joint 23 and a suction joint 24 respectively connected to a discharge port and a suction port of the pump 20, a first passage switch valve 21 connected to a portion of the pipe 15b on the heat exchanger 12 side, the discharge joint 23, and the suction joint 24, and a second passage switch valve 22 connected to a portion of the pipe 15b on the tank 16 side, the suction joint 24, and the discharge joint 23. In this construction, when in the circulating direction switch means 17, the first passage switch valve 21 is switched so that the portion of the pipe 15b on the heat exchanger 12 side is connected to the suction joint 24, and the second passage switch valve 22 is switched so that the portion of the pipe 15b on the tank 16 side is connected to the discharge joint 24, the hot water circulates as indicated by an arrow B in such a manner that the hot water is taken out from the upper end of the tank 16 and returns to the lower end of the tank 16. On the other hand, when in the circulating direction switch means 17, the first passage switch valve 21 is switched so that the portion of the pipe 15b on the heat exchanger 12 side is connected to the discharge joint 23, and the second passage switch valve 22 is switched so that the portion of the pipe 15b on the tank 16 side is connected to the suction joint 24, the hot water circulates as indicated by an arrow A in such a manner that the hot water is taken out from the lower end of the tank 16 and returns to the upper end of the tank 16.

The heat utilization system includes a pipe 32 connected to the lower end of the tank 16 to allow the city water to be supplied therethrough, and a pipe 33 connected to the upper end of the tank 16 to allow the hot water stored in the tank 16 to be supplied to consumers. In this construction, the city water sent to the tank 16 through the pipe 32 is heated by heat recovered from the fuel cell 1 and converted into hot water, which is taken out and supplied to consumers through the pipe 33.

Next, the configuration of the control system will be described. The cogeneration system includes a controller 201, first to third tank temperature sensors 101A to 101C each configured to detect remaining calories in the tank 16 and output signals indicating temperatures of the tank 16, a meter 102 configured to detect consumed calories, a stack temperature sensor 202 configured to detect a temperature of a stack of the fuel cell 1 and output a signal indicating the temperature, a first heat exchanger sensor 18 and a second heat exchanger temperature sensor 19. The controller 201 is configured by a processor, and includes a processor 105, a storage 104, and a clock 103. Herein, as the processor, a microcomputer is used. The processor 105 is CPU, and the storage 104 is semiconductor memory such as ROM or RAM.

The first to third temperature sensors 101A to 101C are each formed by, for example, thermistor or thermocouple, and attached to be capable of detecting a vertical temperature distribution of the tank 16. The first to third temperature sensors 101A to 101C are positioned at centers of surfaces of an upper portion 16a, a center portion 16b, and a lower portion 16b of the tank 16, respectively.

The signals output from the sensors 101A to 101C are input to the processor 105 of the controller 201.

The stack temperature sensor 202 is formed by, for example, thermistor or thermocouple, and provided on the stack of the fuel cell 1. The signal output from the stack temperature sensor 202 is input to the processor 105 of the controller 201.

The meter 102 is attached to the pipe 33 through which the stored hot water is supplied to the consumers. The meter 102 is configured to detect a flow rate of the stored hot water and output a signal indicating the flow rate. The signal output from the flow meter 102 is input to the processor 105 of the controller 201.

The first and second heat exchange sensors 18 and 19 are each formed by, for example, thermistor. The first heat exchanger temperature sensor 18 is attached to the pipe 15a in the vicinity of a position where the pipe 15a is connected to the heat exchanger 12, and the second heat exchanger temperature sensor 19 is attached to the pipe 15b in the vicinity of a position where the pipe 15b is connected to the heat exchanger 12. Signals output from the first and second heat exchange temperature sensors 18 and 19 are input to the processor 105 of the controller 201.

The processor 105 is configured to control ON and OFF of the cooling water heater 100 and an operation of the circulating direction switch means 17.

Although not shown, signals output from desired sensors in the cogeneration system are input to the processor 105, and desired components in the cogeneration system are controlled by the processor 105. The processor 105 performs calculation and processing based on various inputs, and outputs control signals to the components, thereby controlling the cogeneration system including a control for selecting a temperature increasing means.

Subsequently, an operation of the cogeneration system constructed as described above will be described. As described above, this operation is carried out under control of the controller 201. It should be appreciated that the controller 201 is always operating, to be precise, after the cogeneration system is installed.

First, a typical operation will be described. The cogeneration system has three types of operation modes, i.e., a start mode, an operation mode, and a stop mode. In the start mode, the cogeneration system carries out a predetermined operation to start smoothly and safely. In the operation mode, the cogeneration system generates an electric power. And, in the stop mode, the cogeneration system performs a predetermined operation to stop smoothly and safely.

Turning to FIG. 1, more specifically, in the operation mode, a feed gas and water are supplied to the reformer 3, which generates a fuel gas containing hydrogen-rich gas. The fuel gas is supplied to the shifter 4, where concentration of hydrogen of the fuel gas is enhanced through the shift reaction. The resulting fuel gas is supplied to the fuel-gas humidifier 5 and humidified therein. Then, the humidified fuel gas is supplied to a fuel electrode (not shown) of the fuel cell 1.

Meanwhile, the air is supplied as the oxidizing gas from the air supply device 6 to the oxidizing-gas humidifier 7 and humidified therein. The humidified air is supplied to an air electrode (not shown) of the fuel cell 1. The oxidizing gas reacts with the fuel of the fuel electrode and thereby generates electricity and heat.

The fuel and the oxidizing gas remaining unconsumed after the above reaction are discharged outside the fuel cell 1. The generated electricity is supplied to a load or the like through an output portion (not shown).

In the cooling system and the heat utilization system, in the operation mode, the flow rate control valve 13 is fully closed and the flow rate control valve 14 is fully opened. The cooling water pump 9 causes the cooling water to circulate through an internal passage 1a of the fuel cell 1, the pipe 8, and the heat exchanger 12. Thereby, heat (waste heat) generated in the fuel cell 1 is recovered from the fuel cell 1 by the cooling water, and thereby the fuel cell 1 is cooled. The recovered heat is transferred to the hot water within the heat exchanger 12.

In the circulating direction switch means 17, the first passage switch valve 21 is switched so that the portion of the pipe 15b on the heat exchanger 12 side is connected to the discharge joint 23, and the second passage switch valve 22 is switched so that the portion of the pipe 15b on the tank 16 side is connected to the suction joint 24, so that the stored hot water pump 20 causes the hot water to circulate in A direction in such a manner that the water is taken out from the lower end of the tank 16 and returns to the upper end of the tank 16. As a result, within the heat exchanger 12, heat is transferred (recovered) from the cooling water to the hot water and the cooling water is thereby cooled. The hot water that has increased the temperature by the heat transferred from the cooling water is stored in the tank 16 to have a layered temperature distribution in which the temperature increases from the lower side to the upper side. Thus stored hot water is consumed by the consumers as desired through the pipe 33 and a water supply terminal such as a faucet. Then, the city water is supplied to the tank 16 through the pipe 32 to replenish the consumed hot water.

Figure 2:
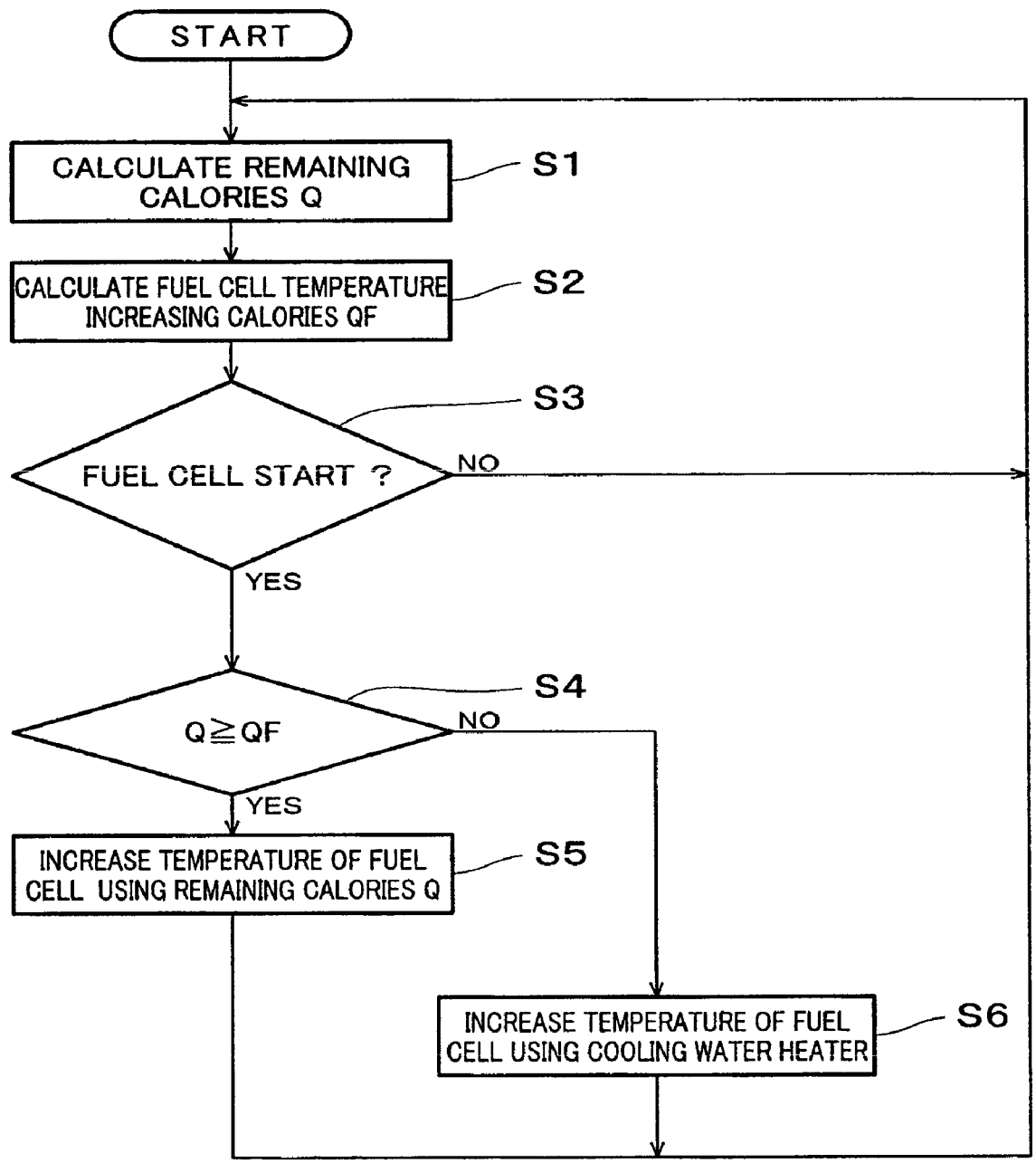
FIG. 2 is a flowchart showing an operation to select a temperature increasing means of the fuel cell cogeneration system in FIG. 1.

Subsequently, the operation to select the temperature increasing means will be described with reference to FIGS. 1 and 2. FIG. 2 is a flowchart showing an operation to select the temperature increasing means of the cogeneration system in FIG. 1.

Turning to FIGS. 1 and 2, in the operation to select the temperature increasing means, the processor 105 of the controller 201 calculates remaining calories Q of the tank 16 (Step S1) as described below.

More specifically, temperatures of the upper portion 16a, the center portion 16b, and the lower portion 16c of the tank 16 are input sequentially from the first to third tank sensors 101A to 101C to the processor 105, respectively. The processor 105 calculates the remaining calories Q in the tank 16 as described below. First, the processor 105 multiplies a product of a volume of the upper portion 16a of the tank 16 and the temperature of the upper portion 16a of the tank 16 which is input from the first temperature processor 105 by a predetermined coefficient, thus calculating remaining calories in the upper portion 16a of the tank 16. And, the processor 105 multiplies a product of a volume of the center portion 16b of the tank 16 and the temperature of the center portion 16b of the tank 16 which is input from the second temperature sensor 105B by a predetermined coefficient, thus calculating remaining calories in the center portion 16b of the tank 16. And, the processor 105 multiplies a product of a volume of the lower portion 16c of the tank 16 and the temperature of the lower portion 16c of the tank 16 which is input from the third temperature sensor 101C by a predetermined coefficient, thus calculating remaining calories in the lower portion 16c of the tank 16. Then, these calories are added to obtain the remaining calories Q in the tank 16. It should be appreciated that the volumes of the portions 16a to 16c of the tank 16 may be measured by experiments.

Then, the processor 105 calculates calories (hereinafter referred to as fuel cell temperature increasing calories) QF required to increase the fuel cell 1 up to an operating temperature (Step S2). Specifically, the signal is input from the stack temperature sensor 202 to the processor 105, which converts the signal to obtain the stack temperature. In the storage 104 of the controller 201, the operating temperature of the fuel cell 1 and a calorific capacity of the stack are stored. The processor 105 reads out these from the storage 104, and multiplies a difference between the operating temperature of the fuel cell 1 and the input stack temperature by the calorific capacity of the stack, thus calculating the fuel cell temperature increasing calories QF. In order to simplify the calculation, a fixed value of the fuel cell temperature increasing calories QF may be stored in the storage 104 and read out as desired without considering the stack temperature.

Subsequently, the processor 105 determines whether or not the fuel cell 1 is going to start (Step S3). As described above, the controller 201 is always operating (i.e., in ON state), and therefore, in the cogeneration system, portions other than the controller 201 start and stop. As used herein, "start time of the fuel cell 1" refers to a time at which a control signal to cause the fuel cell 1 to start the start mode is output from the controller 201 to the fuel cell 1. The time determined by the processor 105 is not intended to be limited to the above "start time", but may be a suitable time in the start mode according to the design.

If it is determined that the fuel cell 1 is not going to start, the processor 105 returns to Step S1. On the other hand, if it is determined that the fuel cell 1 is going to start in Step S3, the processor 105 determines whether or not the remaining calories Q of the tank 16 are not less than the fuel cell temperature increasing calories QF (i.e., threshold calories and hereinafter referred to as a temperature increasing means select threshold QLT) (Step S4).

If it is determined that the remaining calories Q are not less than the temperature increasing calories QF in Step S4, the remaining calories Q are consumed to increase the temperature of the fuel cell 1 (Step S5), whereas if it is determined that the remaining calories Q are less than the temperature increasing calories QF in Step S4, the cooling water heater 100 is used to increase the temperature of the fuel cell 1 (Step S6).

Hereinafter, these temperature increasing operations will be described more specifically. When the remaining calories Q of the tank 16 are consumed to increase the temperature of the fuel cell 1, the flow rate control valve 14 of the cooling system is fully opened, the flow rate control valve 13 is fully closed, and the cooling water pump 9 is operated. Also, in the circulating direction switch means 17, the first passage switch valve 21 is switched so that the portion of the pipe 15b on the heat exchanger 12 side is connected to the suction joint 24, and the second passage switch valve 22 is switched so that the portion of the pipe 15b on the tank 16 side is connected to the discharge joint 23, and the stored hot water pump 20 is operated. The pump 20 causes the hot water to circulate as indicated by the arrow B in such a manner that the hot water is taken out from the upper end of the tank 16 and returns to the lower end of the tank 16. Thereby, the heat stored in the tank 16 is transferred from the hot water to the cooling water within the heat exchanger 12. The resulting cooling water flows through the internal passage 1a of the fuel cell 1 and the heat from the cooling water increases the temperature of the fuel cell 1.

Meanwhile, when the cooling water heater 100 is used to increase the temperature of the fuel cell 1, the flow rate control valve 14 of the cooling system is fully closed, the flow rate control valve 13 is fully opened, and the cooling water pump 9 is operated. In the circulating direction switch means 17, the pump 20 is stopped. Thereby, the cooling water heated by the cooling water heater 100 flows through the internal passage 1a within the fuel cell 1 and thereby increases the temperature of the fuel cell 1.

As should be appreciated from the foregoing, in the first embodiment, only when the remaining calories Q of the tank 16 are not less than the temperature increasing calories QF required to increase the temperature of the fuel cell 1, the remaining calories Q are consumed to increase the temperature of the fuel cell 1 without the use of the cooling water heater 100. This makes it possible to inhibit the hot water from running out due to the temperature increase in the fuel cell 1.

Alternative Example 1 of Embodiment 1

An alternative example 1 of the first embodiment will now be described.

Figure 3:
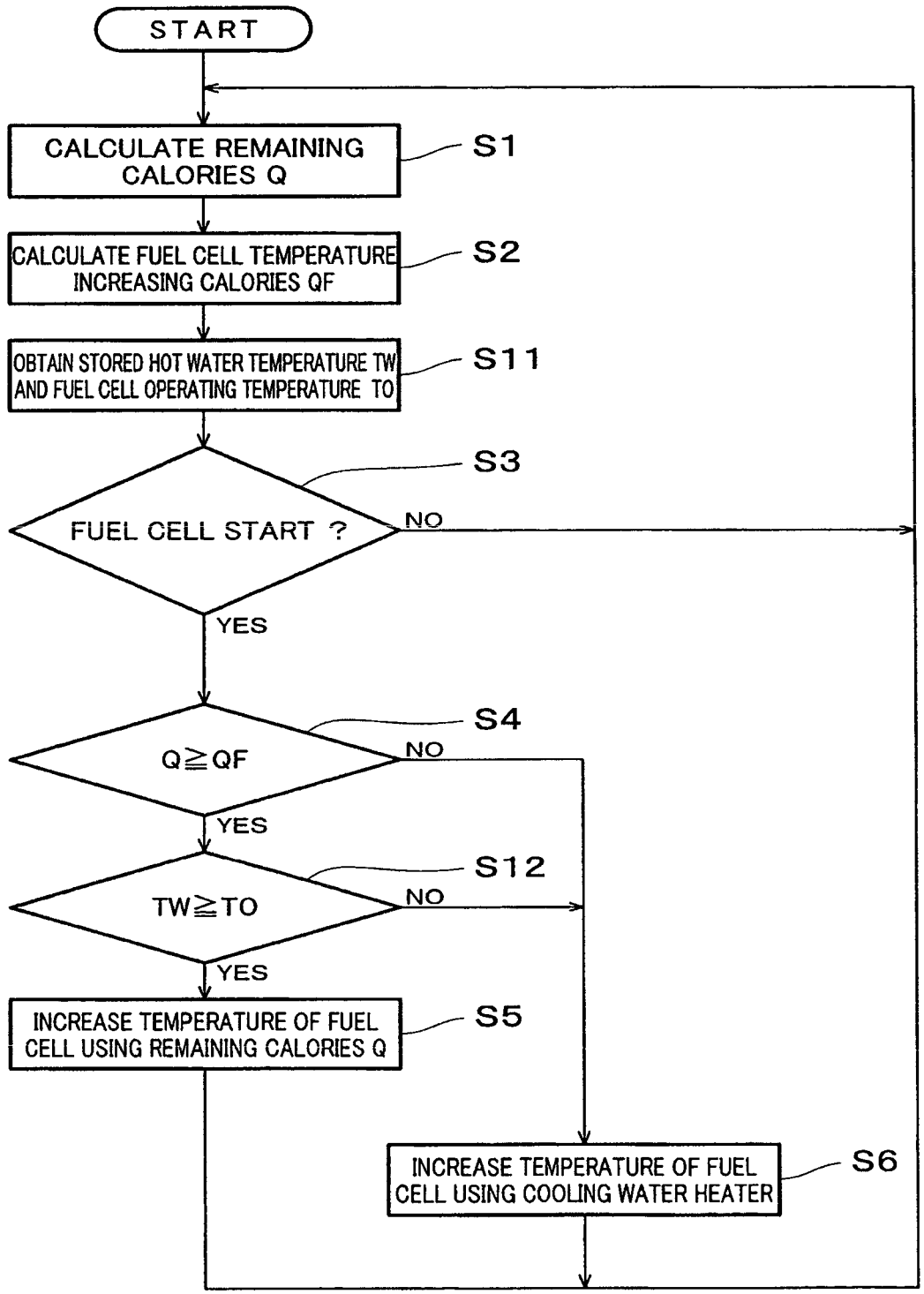
FIG. 3 is a flowchart showing an operation to select a temperature increasing means of a fuel cell cogeneration system according to an alternative example 1 of the first embodiment.

FIG. 3 is a flowchart showing an operation to select a temperature increasing means in a fuel cell cogeneration system according to the alternative example 1.

The construction of the alternative example 1 is substantially identical to that of the first embodiment in FIGS. 1 and 2 except for the operation to select the temperature increasing means under control of the controller 201. Specifically, as shown in FIGS. 1 and 3, the processor 105 of the controller 201 calculates the fuel cell temperature increasing calories QF in Step S2, and thereafter obtains stored hot water temperature TW and fuel cell operating temperature TO in Step S11. More specifically, the processor 105 converts the signal indicating the temperature of the upper portion 16a of the tank 16 which is input from the first tank temperature sensor 101A into a temperature according to a predetermined formula, and uses this converted temperature as stored hot water temperature TW. Also, the operating temperature TO of the fuel cell 1 is prestored in the storage 104 of the controller 201. The processor 105 reads out the operating temperature TO from the storage 104 to thereby obtain it.

If it is determined that the remaining calories Q are not less than the temperature increasing calories QF in Step S4, thereafter, the processor 105 determines whether or not the stored hot water temperature TW is not lower than the operating temperature TO (Step S12). If it is determined that the stored hot water temperature TW is not lower than the operating temperature TO in Step S12, the remaining calories Q are used to increase the temperature of the fuel cell 1 in Step S5, whereas if it is determined that the temperature TW is lower than the operating temperature TO in Step S12, the cooling water heater 100 is used to increase the temperature of the fuel cell 1 in Step S6. In other respect, the operation is identical to the operation in FIG. 2.

Consequently, it is possible to reliably increase the temperature of the fuel cell 1 to the predetermined operating temperature.

Alternative Example 2 of Embodiment 1

Figure 4:
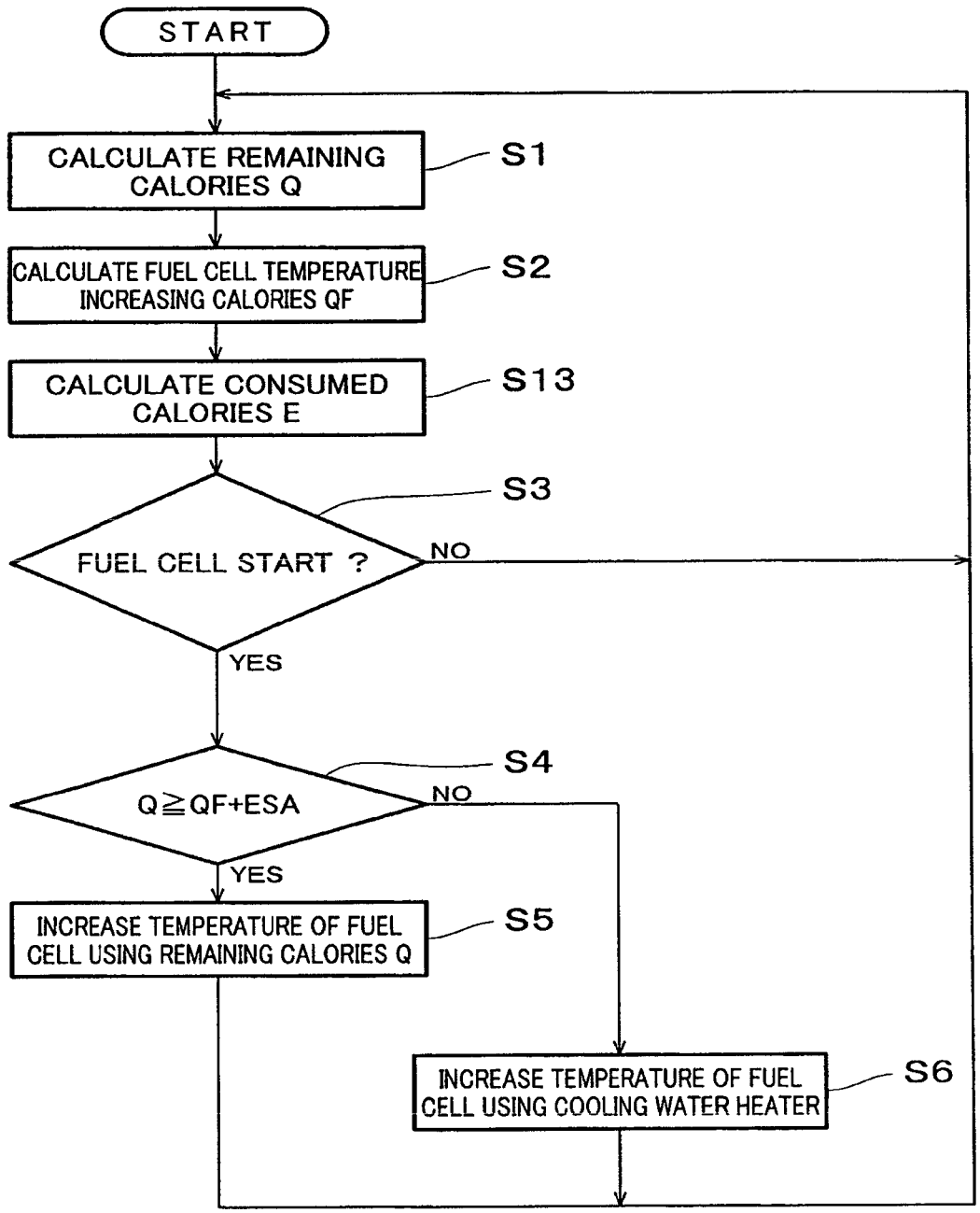
FIG. 4 is a flowchart showing an operation to select a temperature increasing means of a fuel cell cogeneration system according to an alternative example 2 of the first embodiment.
Figure 5:
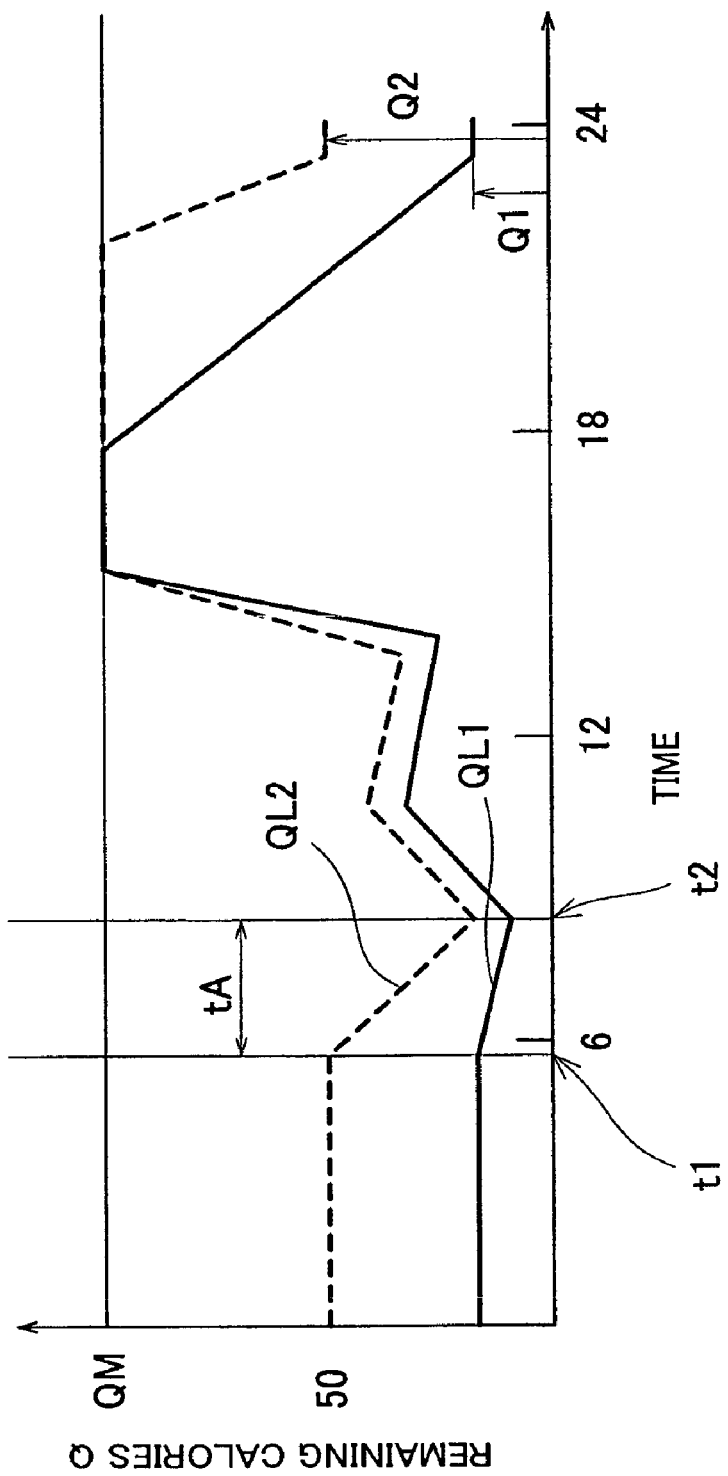
FIG. 5 is a graph showing a time lapse variation in remaining calories for a day.
Figure 6:
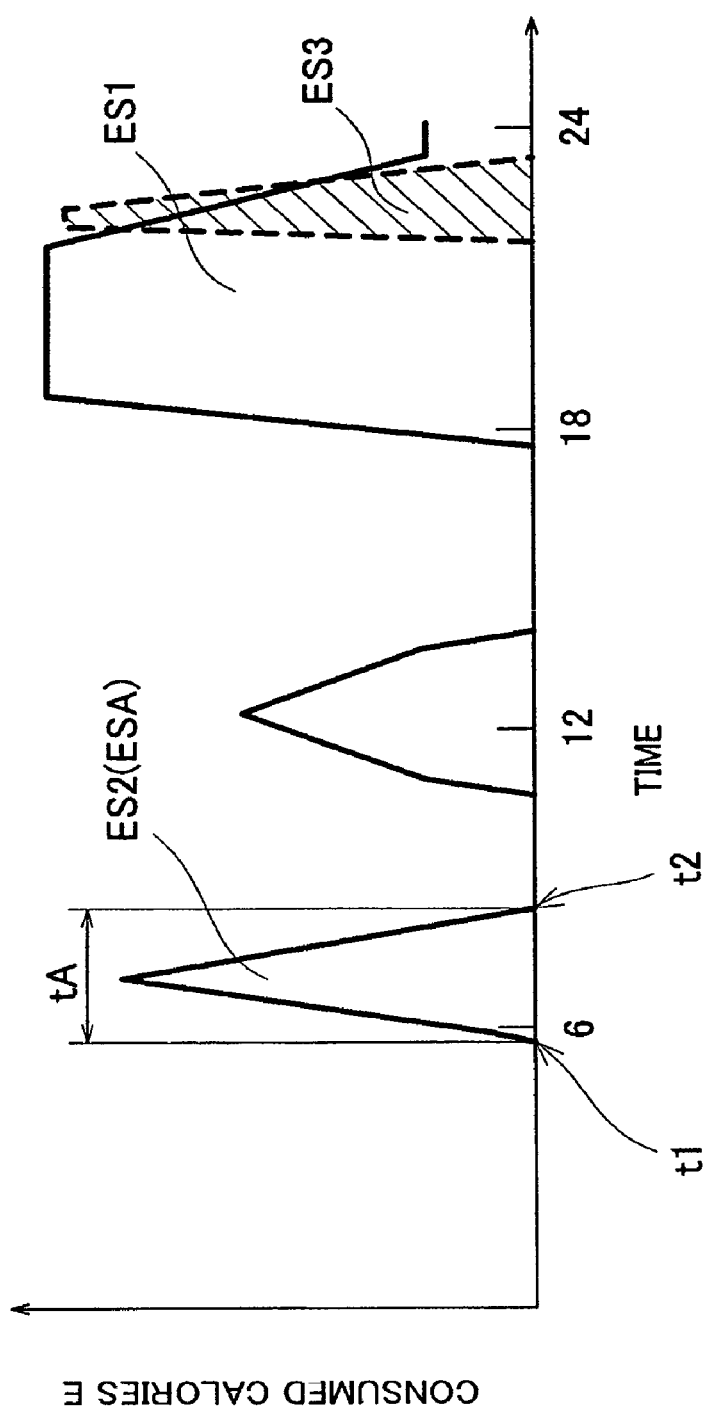
FIG. 6 is a graph showing a time lapse variation in calories consumed by consumers for a day.

An alternative example 2 of the first embodiment will now be described. FIG. 4 is a flowchart showing an operation to select a temperature increasing means of a fuel cell cogeneration system according to the alternative example 2 of the first embodiment. FIG. 5 is a graph showing a time lapse variation in remaining calories for a day. FIG. 6 is a graph showing a time lapse variation in calories consumed by consumers for a day.

The construction of the alternative example 2 is substantially identical to that of the first embodiment in FIGS. 1 and 2 except for the operation to select the temperature increasing means under control of the controller 201. Specifically, as shown in FIGS. 1 and 4, the processor 105 of the controller 201 calculates the remaining calories Q according to the above described method in Step S1, and stores the calculated remaining calories Q and time input from the clock 103 as associated with each other in the storage 104. The remaining calories Q are stored per day. Data of the remaining calories Q corresponding to a predetermined days from now are stored, and sequentially erased (overwritten) after an elapse of the predetermined days.

Then, the processor 105 calculates the temperature increasing calories QF in Step S2, and thereafter, calculates consumed calories E in Step S13. Specifically, the flow rates of the stored hot water (hereinafter expressed as supplied hot water) consumed through the pipe 33 are sequentially input from the meter 102 to the processor 105 of the controller 102. And, the temperatures of the upper portion 16a of the tank 16 are sequentially input from the first temperature sensor 101A of the processor 105. The processor 105 multiplies a product of the flow rate of the supplied hot water input from the meter 102 and the temperature of the upper portion 16a of the tank 16 which is input from the first tank temperature sensor 101A by a predetermined coefficient, thus calculating the calories E consumed by the consumers. The consumed calories E and the time input from the clock 103 are stored as associated with each other in the storage 104. The consumed calories E are stored per day. Data of the consumed calories E corresponding to a predetermined days from now are stored, and sequentially erased (overwritten) after an elapse of the predetermined days.

Then, the processor 105 determines whether or not the fuel cell 1 is going to start (Step S3). The Steps S1, S2, S13, and S3 are repeated until the fuel cell 1 starts. When the fuel cell 1 starts, the processor 105 determines whether or not the remaining calories Q of the tank 16 are not less than a total of temperature increasing calories QF and start time period consumed calories ESA of the consumed calories E (Step S4).

If it is determined that the remaining calories Q are not less than the total of the temperature increasing calories QF and the start time period consumed calories ESA in Step S4, the remaining calories Q are consumed to increase the temperature of the fuel cell 1 (Step S5), whereas when the remaining calories Q are less than the total of the temperature increasing calories QF and the start time period consumed calories ESA, the cooling water heater 100 is used to increase the temperature of the fuel cell 1 (Step S5).

Subsequently, how the temperature increasing means is determined will be described in detail. The processor 105 repeats the operations in Steps S1, 2, 13, and 4 to 6, and thereby the time lapse variation in the calories consumed per day and the time lapse variation in the remaining calories per day are stored in the storage 104.

The consumed calories (substantially the amount of supplied hot water) E varies with an elapse of time per day as represented by a solid line in FIG. 6. Turning to FIG. 6, calories are consumed around six a.m., around twelve at noon, and around eighteen to twenty four during a time period from the evening to night. In particular, consumed calories ES1 around eighteen to twenty four are more than the others. In this case, the remaining calories Q of the tank 16 vary as represented by a solid line in FIG. 5, and finally becomes Q1 at the end of the day (around twenty four).

In this alternative example 2, the cogeneration system is configured to automatically start and stop. The cogeneration system starts around six in the morning (time t1) and stops around twenty four at night. Also, in the alternative example 2, the consumed calories E as a reference to be used for determining the temperature increasing means are determined considering life pattern of the consumers. Specifically, consumed calories ES2 during the start time period (period tA (time: t1 to t2) are used as a reference for determination and hereinafter referred to as start time period consumed calories ESA. As used herein, "start time period" means a time period from when the cogeneration system starts until calorie consumption started upon start of the system or after the start of the system stops for a predetermined time period or longer. In the alternative example 2, the predetermined time period is 60 minutes, but is not intended to be limited to this, because the frequency at which the consumers consume calories varies depending on how the consumers consume calories or the number of consumers. For example, when the consumers consume calories frequently or many consumers consume calories, the predetermined time period is required to be set longer, whereas when the consumers consume calories less frequently or the number of consumers is less, the predetermined time period is required to be set shorter. Thus, "start time period" can be determined according to how the calories are actually consumed.

When the time lapse variation in the remaining calories Q and the time lapse variation in the consumed calories E in a day are represented by solid lines in FIGS. 5 and 6, the processor 105 determines, at start (time t1) of the fuel cell 1 in the following day in Step S4, whether or not calories Q1 of the remaining calories Q are not less than a total of consumed calories ES2 of the start time period consumed calories ESA and the temperature increasing calories QF. Here it is assumed that the remaining calories Q1 are less than the total of the consumed calories ES2 and the temperature increasing calories QF. In this case, the processor 105 determines that the remaining calories Q are less than the total of the temperature increasing calories QF and the start time period consumed calorie ESA, and uses the cooling water heater 100 to increase the temperature of the fuel cell 1 (Step S6). This makes it possible to inhibit the hot water from running out in the case where the calories (ES2) are assumed to be consumed during start of the fuel cell 1 according to the life pattern. In FIG. 5, reduction amount QL1 of the remaining calories Q during a time period tA corresponds to a total of the consumed calories ES2 and the temperature increasing calories QF.

When calories ES3 consumed during the time period from eighteen to twenty four in that day are less as indicated by a dashed line in FIG. 6, the remaining calories Q of the tank 16 finally become Q2 as indicated by a dashed line in FIG. 5. Here it is assumed that the remaining calories Q2 are more than the total of the consumed calories ES3 and the temperature increasing calories QF. In this case, at start of the fuel cell 1 in the following morning, the processor 105 determines that the remaining calories Q are not less than the total of the temperature increasing calories QF and the start time period consumed calories ESA in Step S4 and starts the fuel cell 1 using the remaining calories Q. By doing so, in the cogeneration system, the temperature of the fuel cell 1 is increased while ensuring the consumed calories ES2 during the time period tA. This results in reduction QL2 of the remaining calories Q corresponding to the total of the consumed calories ES2 caused by hot water supply and the temperature increasing calories QF during the time period tA, but the hot water will not run out at the end t2 of consumption of the hot water.

As should be appreciated from the foregoing, in accordance with the alternative example 2, the recovered heat can be efficiently utilized during start of the fuel cell 1 depending on the remaining calories Q stored in the tank 16 during the operation without running out the hot water to be consumed by consumers.

While the consumed calories ES2 during the start time period tA in preceding (previous) day are employed as the start time period consumed calories ESA, a fixed value may be set as the calories ESA for the sake of simplicity.

Alternative Example 3 of Embodiment 1

An alternative example 3 of the first embodiment will be described. In the alternative example 2, the threshold QLT for determination of the temperature increasing means is set considering the life pattern of the consumers. Specifically, the consumed calories ES2 during the start time period tA in the previous day are used as the start time period consumed calories ESA. However, the consumed calories ES2 vary from one day to another. Especially when the difference in the consumed calories ESA between a day and a previous day is large, it may be impossible to appropriately inhibit the hot water from running out. The alternative example 3 of the first embodiment is directed to solving this problem.

Figure 7:
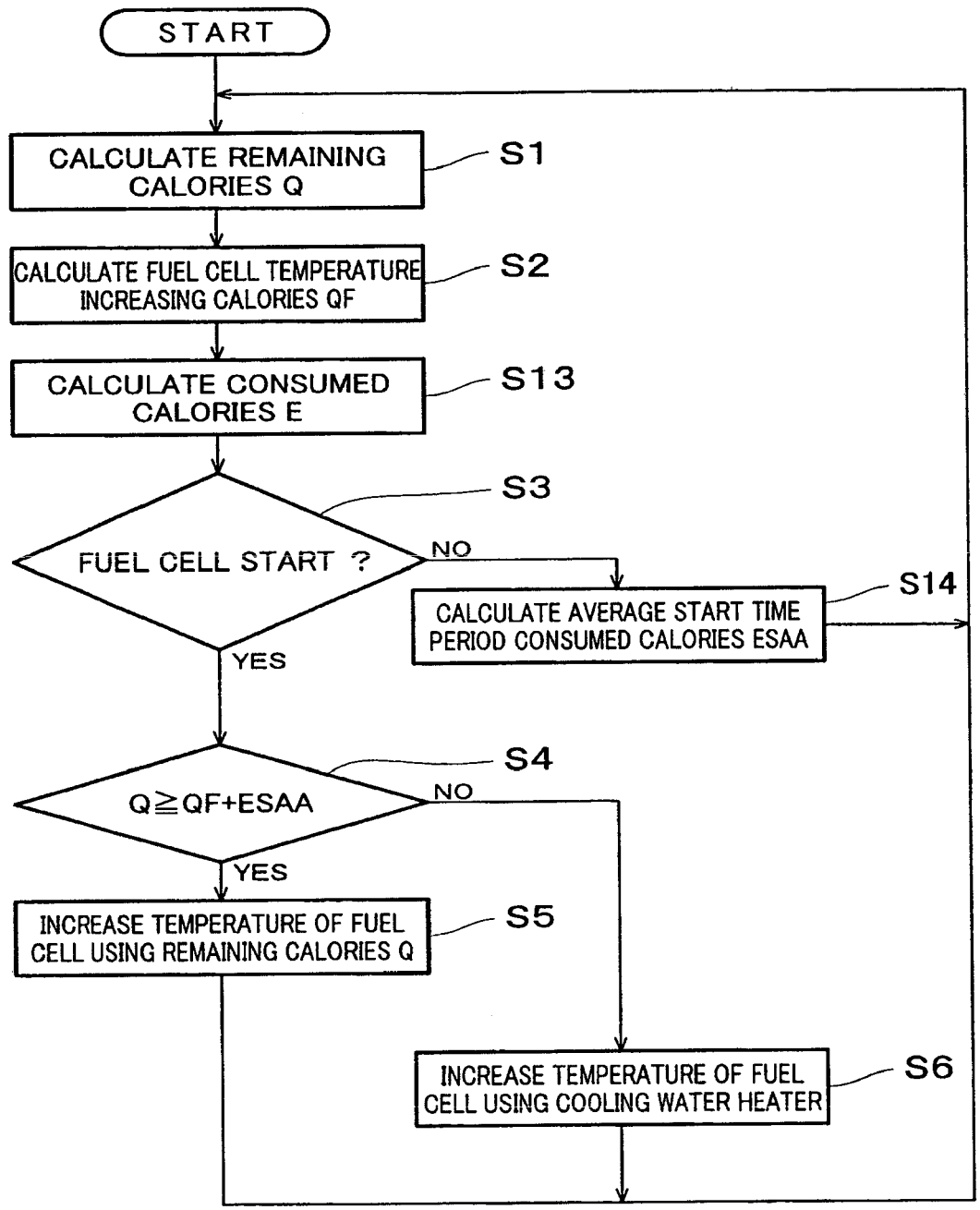
FIG. 7 is a flowchart showing an operation to select a temperature increasing means of a fuel cell cogeneration system according to an alternative example 3 of the first embodiment.

FIG. 7 is a flowchart showing an operation to select a temperature increasing means of a fuel cell cogeneration system according to the alternative example 3.

The alternative example 3 differs from the alternative example 2 in the following respects. Turning to FIG. 7, if it is determined that the fuel cell 1 is not going to start in Step S3, the processor 105 calculates an average value ESAA for each predetermined time period of the start time period consumed calories ESA (consumed calories ES2 during the time period tA in the start time period), and stores the average value (hereinafter expressed as average start time period consumed calories) ESAA of the start time period consumed calories ESA in the storage 104. As the predetermined period, for example, one week, one month, or season is used. The average start time period consumed calories ESAA are updated in each period longer than the predetermined period.

In Step S4, the processor 105 determines whether or not the remaining calories Q are not less than the total of the temperature increasing calories QF and the average start time period consumed calories ESAA. In other respect, the alternative example 3 is similar to that of the alternative example 2.

In accordance with the alternative example 3 of the first embodiment, since the average value ESAA is used as the start time period consumed calories ESA which is considered to determine the temperature increasing means select threshold QLT, variation in the threshold QLT becomes smaller, and it is possible to inhibit the hot water from running out when the difference in the consumed hot water between a day and a previous day is large.

Embodiment 2

Although the temperature increasing means select threshold QLT is set considering the life pattern of consumers in the alternative examples 2 and 3 of the first embodiment, the life pattern of the consumers varies depending on seasonal change. In general, the calories used for hot water supply or air conditioning in the morning tend to increase as ambient air temperature decreases. In the second embodiment, the threshold OLT is set considering the variation in the consumed calories during the start time period due to such seasonal change.

Figure 8:
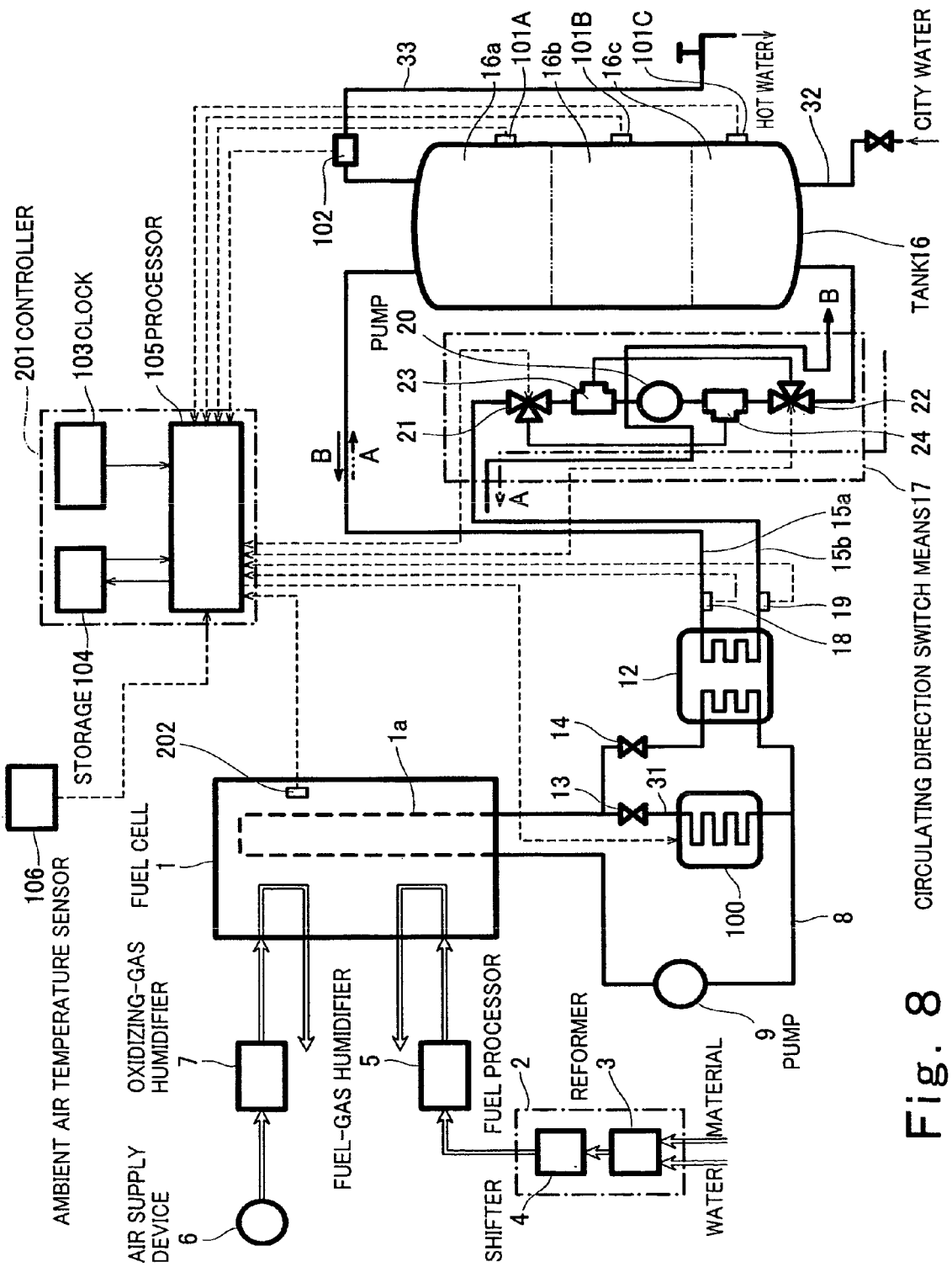
FIG. 8 is a block diagram showing a construction of a fuel cell cogeneration system according to a second embodiment of the present invention.

FIG. 8 is a block diagram showing a construction of a fuel cell cogeneration system according to the second embodiment of the present invention. In FIG. 8, the same reference numerals as those in FIG. 1 denote the same or corresponding parts which will not be further described.

In the second embodiment, an ambient air temperature sensor 106 is attached at a proper position to detect ambient air temperature. A signal indicating the detected temperature is input from the ambient air temperature sensor 106 to the processor 105 of the controller 201. Considering the detected ambient air temperature, the processor 105 selects the temperature increasing means. As the ambient air sensor 106, a temperature sensor such as thermistor is used. In other construction, the second embodiment is similar to the first embodiment (construction in FIGS. 1 and 2).

Figure 9:
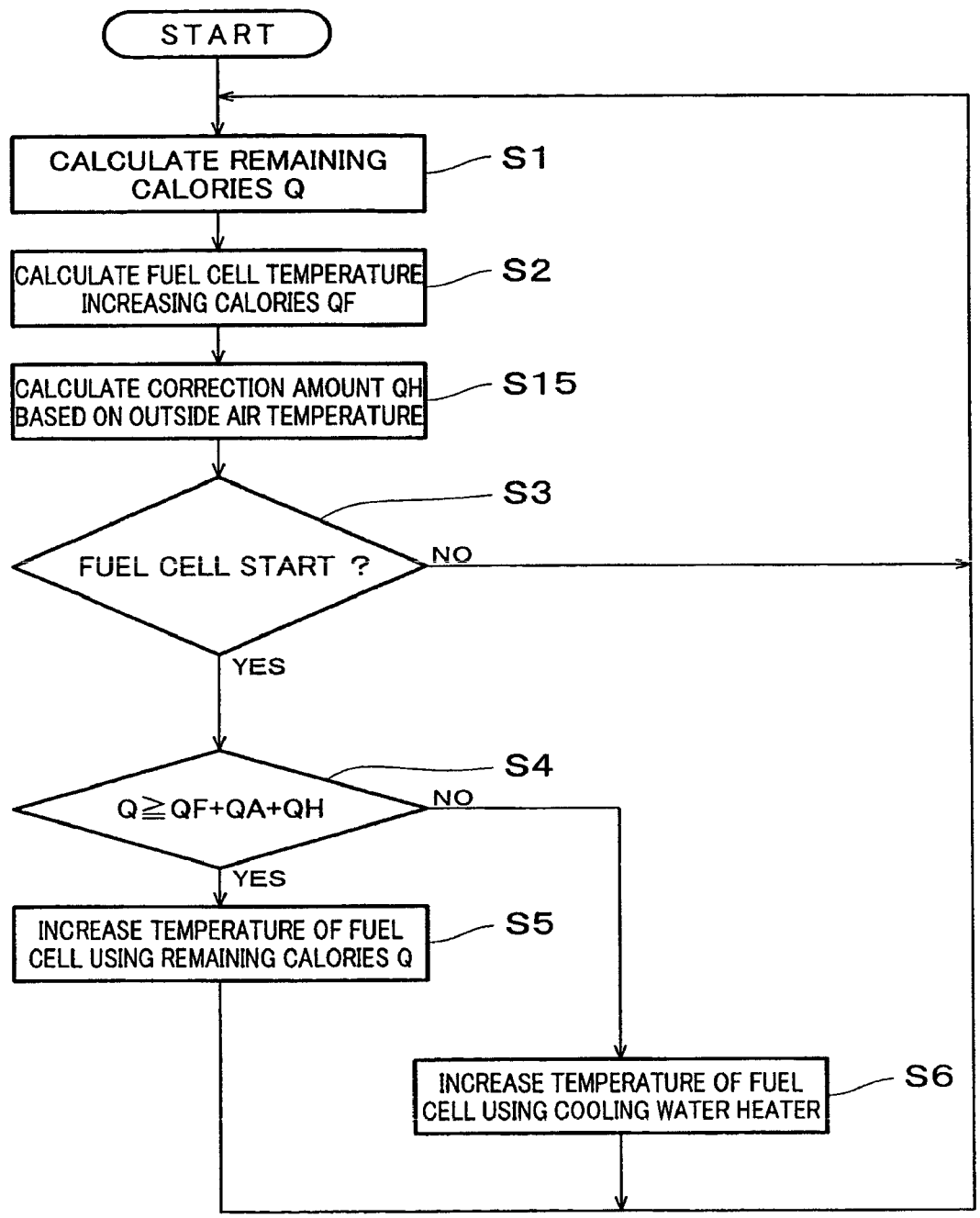
FIG. 9 is a flowchart showing an operation to select a temperature increasing means of the fuel cell cogeneration system in FIG. 8.

Subsequently, an operation of the cogeneration system so constructed will be described. FIG. 9 is a flowchart showing an operation to select a temperature increasing means of the cogeneration system in FIG. 8. In FIG. 9, the same reference numerals as those in FIG. 4 denote the same or corresponding steps which will not be further described.

Turning to FIGS. 8 and 9, in the second embodiment, the processor 105 calculates the fuel cell temperature increasing calories QF in Step S2, and thereafter, calculates correction amount QH based on the ambient air temperature in Step S15. And, in Step S4, the processor 105 determines whether or not the remaining calories Q are not less than a total of the temperature increasing calories QF, reference start time period consumed calories QA, and the correction amount QH. The other configuration is identical to that of the first embodiment in FIGS. 1 and 2.

Hereinafter, the difference between the first embodiment and the second embodiment will be described in detail.

Figure 10:
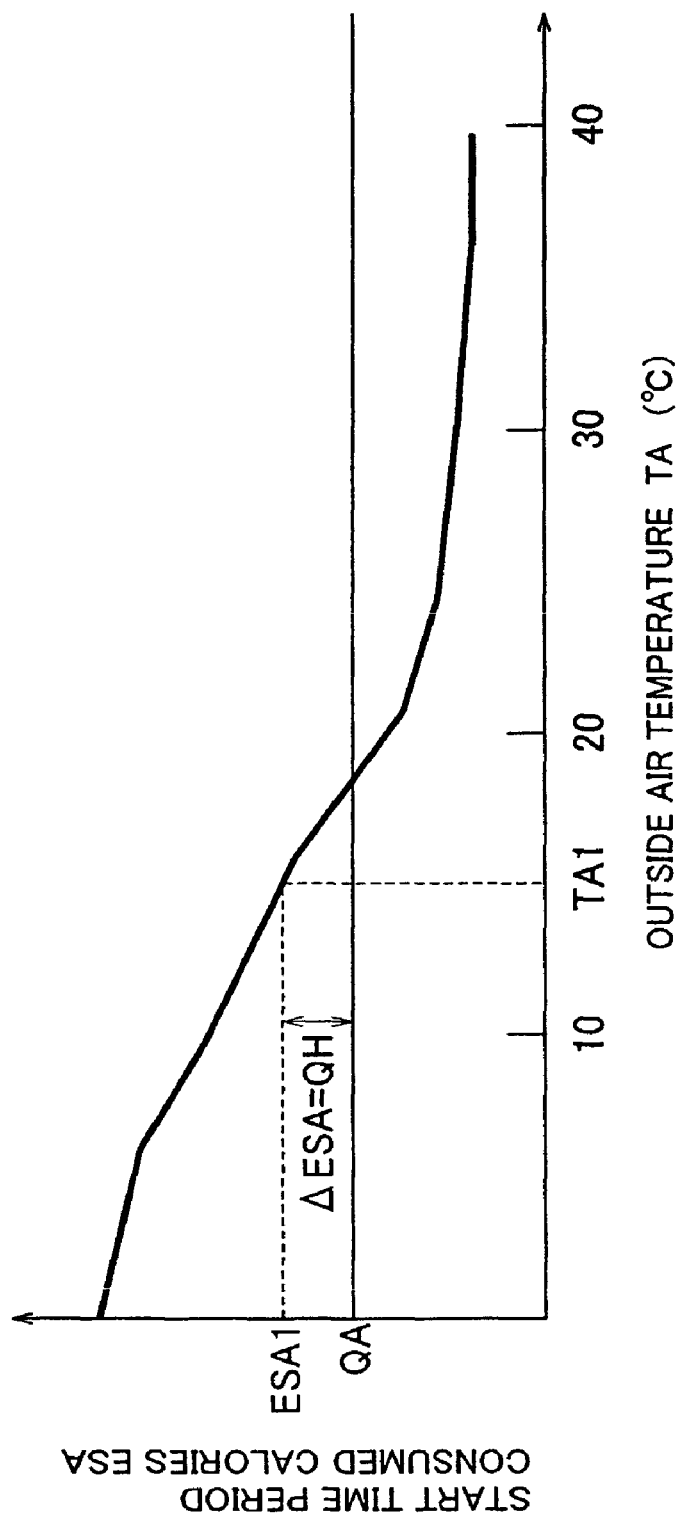
FIG. 10 is a graph showing a variation in start time period consumed calories relative to a variation in ambient air temperature.

FIG. 10 is a graph showing a variation in start time period consumed calories ESA relative to a variation in ambient air temperature TA (ambient air temperature—start time period consumed calorie characteristic and hereinafter simply expressed as characteristic).

In general, during the start time period tA, the consumed calories increase as the ambient air temperature decreases. In the second embodiment, the characteristic is prestored in the storage 104 of the controller 201. The characteristic is obtained from, for example, experiment or simulation. FIG. 10 shows an example of the characteristic. And, the reference start time period consumed calories (hereinafter referred to as reference calories) QA for setting the temperature increasing means select threshold QLT using the characteristic is stored in the storage 104. The reference calories QA may be set to a desired value. Herein, the reference calories QA are set to start time period consumed calories corresponding to standard ambient air temperature in the characteristic.

In Step S15, the processor 105 converts the signal input from the ambient air temperature sensor 106 into the ambient air temperature TA and obtains it, and reads out the characteristic and the reference start time period consumed calories QA from the storage 104. And, the processor 10 obtains a difference ΔESA between the start time period consumed calories ESA (ESA1 in FIG. 10) corresponding to the ambient air temperature TA (TA1 in FIG. 10) on the characteristic and the reference calories QA as correction amount QH.

And, in Step S4, if it is determined that the remaining calories Q are not less than a total of the temperature increasing calories QF, the reference calories QA, and the correction amount QA, that is, $$Q \geq QF + QA + QH = QLT$$

the remaining calories Q are consumed to increase the temperature of the fuel cell 1 (Step S5).

On the other hand, if it is determined that the remaining calories Q are less than the total of the temperature increasing calories QF, the reference calories QA, and the correction amount QH, that is, $$Q < QF + QA + QH = QLT$$

the cooling water heater 100 is used to increase the temperature of the fuel cell 1 (Step S6).

In accordance with the second embodiment, since the variation in the consumed calories during the start time period tA due to seasonal change may be accommodated by automatically correcting the temperature increasing means select threshold QLT, it is possible to achieve convenient and energy-saving cogeneration system capable of inhibiting hot water from running out.

While the above-identified characteristic is obtained from, for example, experiment, the characteristic may alternatively obtained in such a manner that the start time period consumed calories ESA are calculated as in the first embodiment, the calculated calories ESA and the ambient air temperature TA detected by the ambient air temperature sensor 106 is stored in the storage 104 of the controller 201, and the processor 105 is statistically process the calories ESA and the ambient air temperature TA stored in the storage 104 by regression analysis, thereby obtaining the characteristic.

Alternative Example 1 of the Embodiment 2

An alternative example 1 of the second embodiment will now be described.

In the alternative example 1, the ambient air temperature sensor 106 configured to detect the ambient air temperature, which is shown in FIG. 8, is omitted. And, the processor 105 calculates monthly average start time period consumed calories and selects temperature increasing means based on the monthly average start time period consumed calories. This follows that the temperature increasing means is selected considering the ambient air temperature. The other construction is identical to that in FIGS. 8 and 9.

Hereinafter, the difference between the construction of the alternative example 1 and the construction in FIGS. 8 and 9 will be described.

Figure 11:
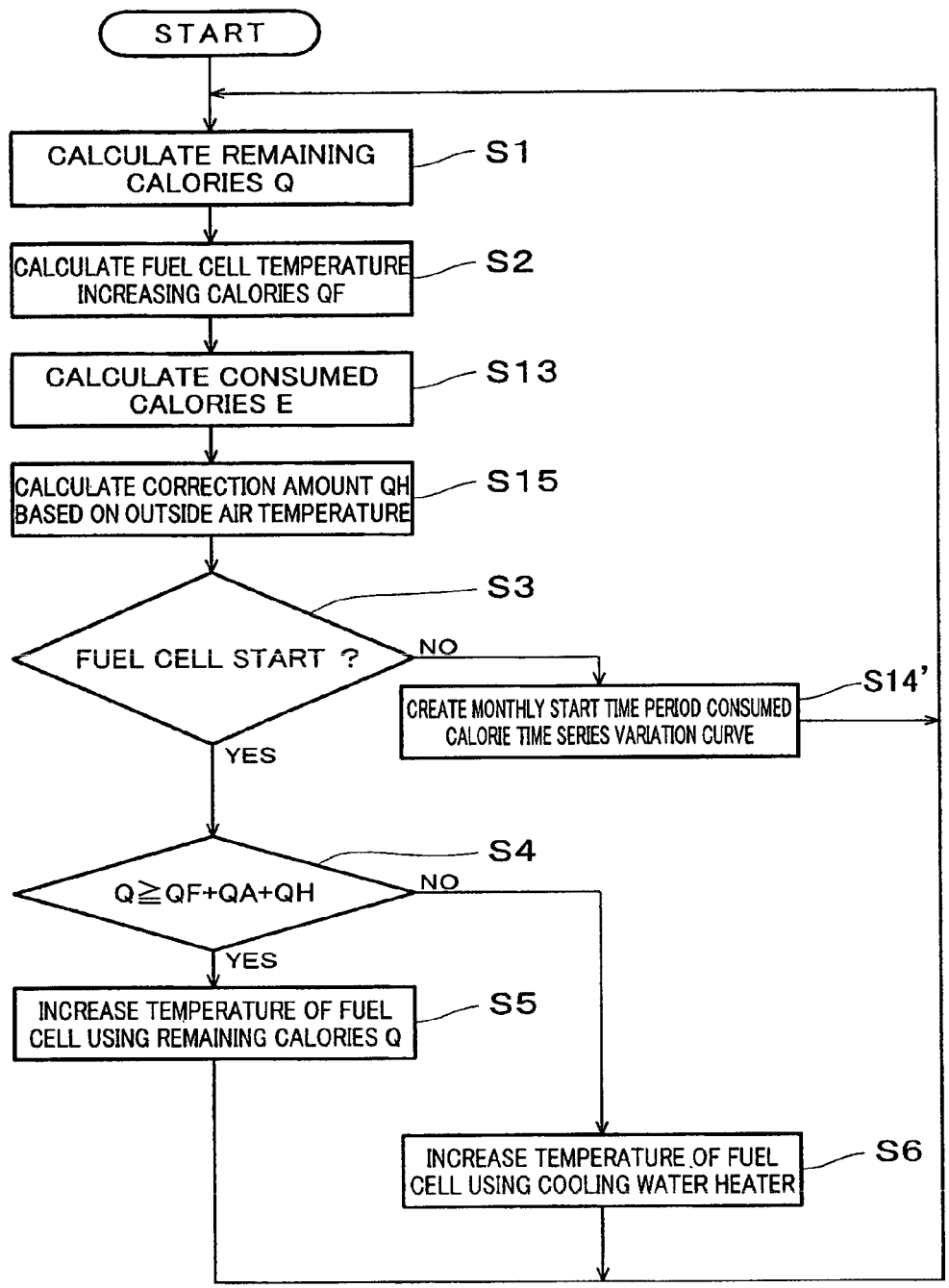
FIG. 11 is a flowchart showing an operation to select a temperature increasing means of a fuel cell cogeneration system according to an alternative example 1 of the second embodiment.
Figure 12:
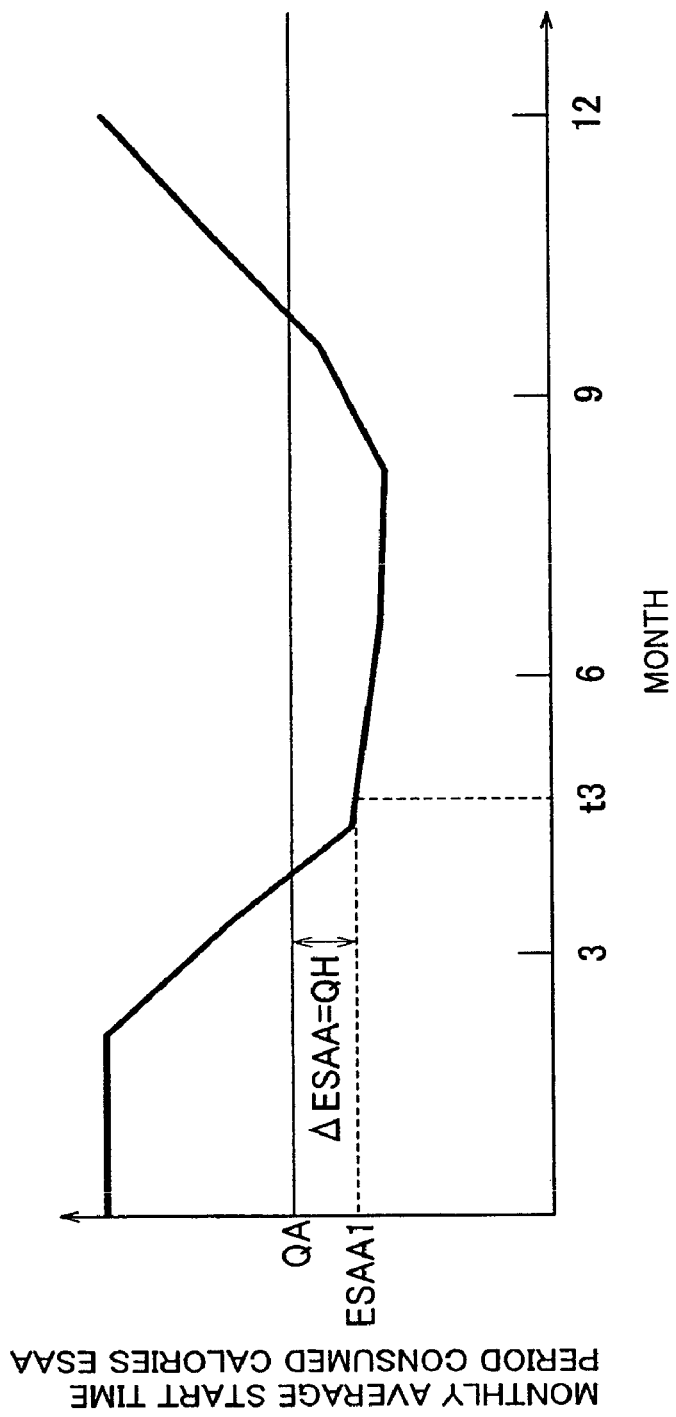
FIG. 12 is a graph showing a time lapse variation in monthly average start time period consumed calories.

FIG. 11 is a flowchart showing an operation to select a temperature increasing means of a fuel cell cogeneration system according to the alternative example 1 of the second embodiment. FIG. 12 is a graph showing a time lapse variation in monthly average start time period consumed calories in the fuel cell cogeneration system of the alternative example 1.

Turning to FIGS. 8 and 11, in the alternative example 1 of the second embodiment, the processor 105 calculates the fuel cell temperature increasing calories QF in Step S2 and then calculates consumed calories E in Step S13 as in the alternative example 2 of the first embodiment.

Thereafter, the processor 105 calculates correction amount QH based on ambient air temperature in Step S15. And, if it is determined that the fuel cell 1 is not going to start in Step S3, thereafter, the processor 105 creates a monthly start time period consumed calorie variation curve in Step S14'. The other configuration is identical to that of the operation to select the temperature increasing means in FIG. 9.

The processor 105 creates the curve in Step S14' in such a manner that the start time period consumed calories SEA of the consumed calories E calculated in Step S13 are added for each month, and divided by the number of days in each month to obtain monthly average start time period consumed calories ESAA, and the calories ESAA are stored in the storage 104 as associated with the each month. For example, this data for the last one year from now are stored, and are sequentially erased (or overwritten) after an elapse of one year. As shown in FIG. 12, the processor 105 linearly interpolates plots of monthly average start time period consumed calories ESAA for the last one year on time axis-monthly average start time period consumed calories ESAA axis plane to create the time lapse variation curve of the monthly average start time period consumed calories ESAA for one year (hereinafter expressed as monthly start time period consumed calorie variation curve) and stores the curve in the storage 104.

The reference start time period consumed calories QA for setting the temperature increasing means select threshold QLT using the monthly start time period consumed calorie variation curve are stored. The reference calories QA may be set to a desired value, but is set to standard monthly start time period consumed calories in the monthly start time period consumed calorie variation curve.

In Step S15, the processor 105 obtains current time from the clock 103 and reads out the monthly start time period consumed calorie variation curve and the reference calories QA from the storage 104. And, the processor 105 obtains a difference ΔESAA between the monthly average start time period consumed calories ESAA (ESAA1 in FIG. 12) corresponding to the current time t (t3 in FIG. 12) on the monthly start time period consumed calorie variation curve, and the reference calories QA as correction amount QH.

In Step S4, if it is determined that the remaining calories Q are not less than a total of the fuel cell temperature increasing calories QF, the reference calories QA, and the correction amount QA, that is, $Q \geq QF+QA+QH=QLT$ the remaining calories Q are consumed to increase the temperature of the fuel cell 1 (Step S5).

On the other hand, in Step S4, if it is determined that the remaining calories Q are less than the total of the temperature increasing calories QF, the reference calories QA, and the correction amount QH, that is, $Q < QF+QA+QH=QLT$ the cooling water heater 100 is used to increase the temperature of the fuel cell 1 (Step S6).

In accordance with the alternative example 2, since the variation in the start time period consumed calories due to seasonal change may be accommodated by automatically correcting the temperature increasing means select threshold QLT, it is possible to achieve convenient and energy-saving cogeneration system capable of inhibiting hot water from running out. In addition, the ambient air temperature sensor 106 may be omitted.

While the monthly start time period consumed calorie time lapse variation curve is obtained in real time, this may alternatively be obtained from experiment, etc, and stored in the storage 104 of the controller 201.

While the correction amount QH is calculated based on either the ambient air temperature—start time period consumed calorie characteristic or the monthly start time period consumed calorie time lapse variation curve, this may alternatively be done based on both of them. In that case, for example, correction amount QH' and correction amount QH" are calculated based on both of them, and the correction amount QH may be obtained by adding these correction amounts QH' and QH" by weighting in a predetermined ratio.

Embodiment 3

Figure 13:
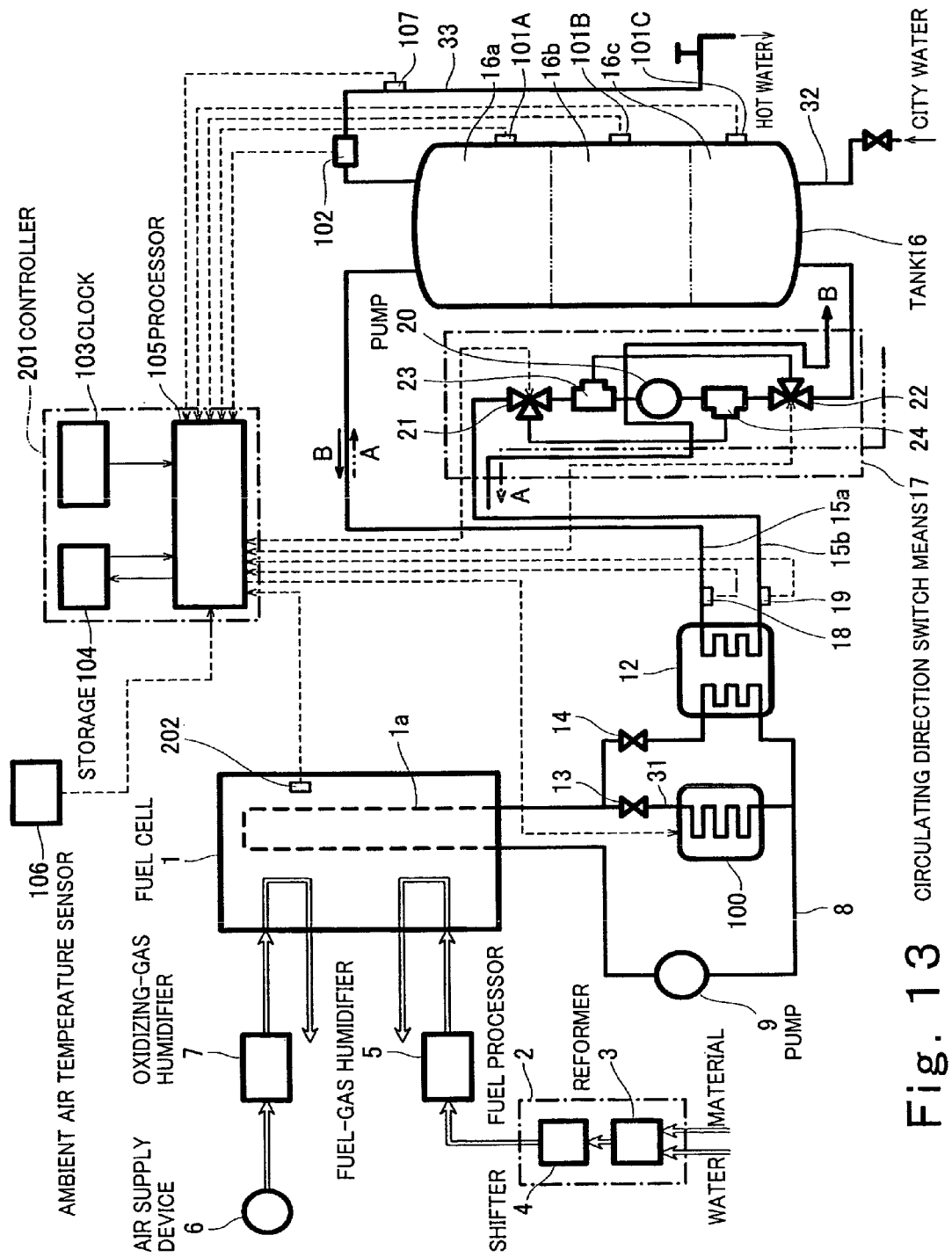
FIG. 13 is a block diagram showing a construction of a fuel cell cogeneration system according to a third embodiment of the present invention.

FIG. 13 is a block diagram showing a construction of a fuel cell cogeneration system according to a third embodiment of the present invention. In FIG. 13, the same reference numerals as those in FIG. 8 denote the same or corresponding parts which will not be further described.

Turning to FIG. 13, in the third embodiment, a supplied hot water temperature sensor 107 is attached to the pipe 33 through which the hot eater stored in the tank 16 is supplied to consumers and configured to detect temperature of supplied hot water. An output of the supplied hot water sensor 107 is input to the processor 105 of the controller 201. And, the processor 105 selects temperature increasing means considering the detected temperature of the supplied hot water. The other configuration is identical to that of the second embodiment.

Subsequently, an operation of the above constructed cogeneration system will be described.

Figure 14:
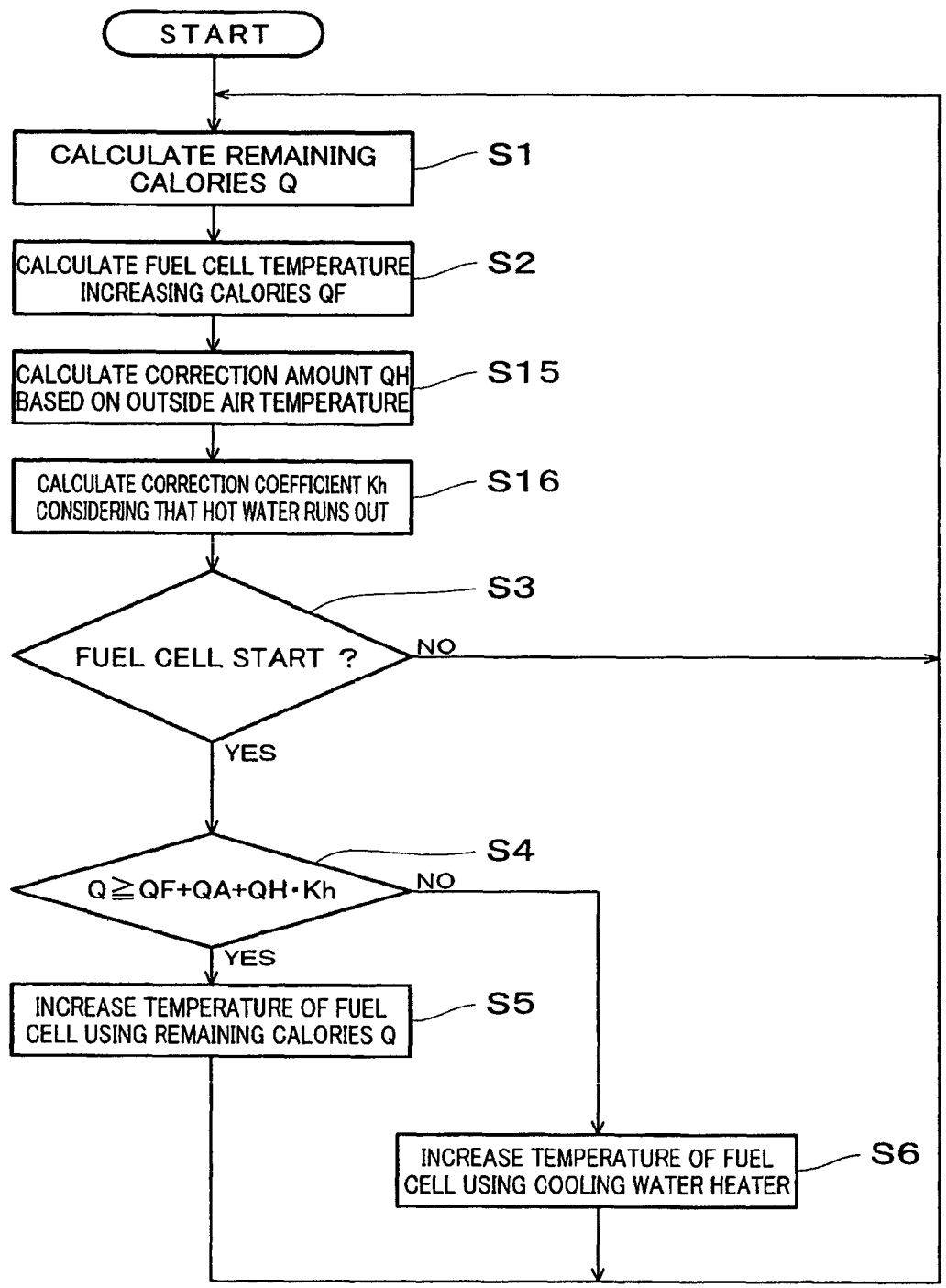
FIG. 14 is a flowchart showing an operation to select a temperature increasing means of the fuel cell cogeneration system in FIG. 13.

FIG. 14 is a flowchart showing an operation to select a temperature increasing means of the fuel cell cogeneration system in FIG. 13. In FIG. 14, the same reference numerals as those in FIG. 9 denote the same or corresponding steps which will not be further described.

Turning to FIG. 14, in the third embodiment, the processor 105 calculates correction amount QH based on the ambient air temperature in Step S15, and then in Step S16, calculates a correction coefficient Kh considering that the hot water may run out. Specifically, the signal indicating the detected temperature is input from the sensor 107 to the processor 105, which converts the signal into supplied hot water temperature to thereby obtain it. A predetermined threshold of the temperature of the supplied hot water is prestored in the storage 104. The predetermined threshold is set to, for example, a normal temperature of city water. The processor 105 reads out the threshold from the storage 104 and compares the threshold to the obtained supplied hot water temperature. When the supplied hot water temperature is not higher than the threshold, the processor 105 determines that the hot water has run out. This is based on the fact that the temperature of the supplied hot water decreases to the temperature of the city water when the hot water is running out.

Then, in Step S16, the processor 105 calculates the correction coefficient Kh by which the correction amount QH is to be multiplied. The correction coefficient Kh is 1.0 or more, and increases according to the number of times the hot water has run out per predetermined time (e.g., per day).

In Step S4, the processor 105 determines whether or not the remaining calories Q are not less than a total of the temperature increasing calories QF, the reference calories QA, and a product of the correction amount QH and the correction coefficient Eh.

If it is determined that the remaining calories Q are not less than the total of the temperature increasing calories QF, the reference calories QA, and the product of the correction amount QH and the correction coefficient Kh, that is, $$Q \geq QF + QA + QH \times Kh = QLT$$

the remaining calories Q are consumed to increase the temperature of the fuel cell 1 (Step S5).

On the other hand, in Step S4, if it is determined that the remaining calories Q are less than the total of the temperature increasing calories QF, the reference calories QA, and the product of the correction amount QH and the correction coefficient Kh, that is, $$Q < QF + QA + QH \times Kh = QLT$$

the cooling water heater 100 is used to increase the temperature of the fuel cell 1 (Step S6).

As should be appreciated from the foregoing, in the third embodiment, if the hot water should run out due to an increase in calories consumed by consumers, the cogeneration system is controlled to accommodate such variation by automatically increasing the temperature increasing means select threshold QLT. Therefore, it is possible to achieve a convenient and energy-saving cogeneration system which does not run out calories consumed by consumers during start of the fuel cell 1.

It is obvious that the above described construction is applicable to the alternative example 1 of the second embodiment in the same manner as described above. In that case, the correction amount QH calculated in the alternative example 1 of the second embodiment may be multiplied by the correction coefficient Kh obtained in Step S16, and in Step S4, it may be determined whether or not the remaining calories Q are not less than the total of the temperature increasing calories QF, the reference calories QA, and the product of the correction amount QH and the correction coefficient Kh.

Embodiment 4

In the fourth embodiment, the alternative example 1 of the first embodiment is altered. Hardware of the fuel cell cogeneration system of the fourth embodiment is configured as in the fuel cell cogeneration system of the second embodiment in FIG. 8. That is, the ambient air temperature sensor 106 is added to the construction (FIG. 1) of the hardware of the fuel cell cogeneration system of the alternative example 1 of the first embodiment. And, the processor 105 of the controller 201 selects the temperature increasing means considering the ambient air temperature and the stored hot water temperature. The other configuration is identical to that of the alternative example 1 of the first embodiment.

Figure 15:
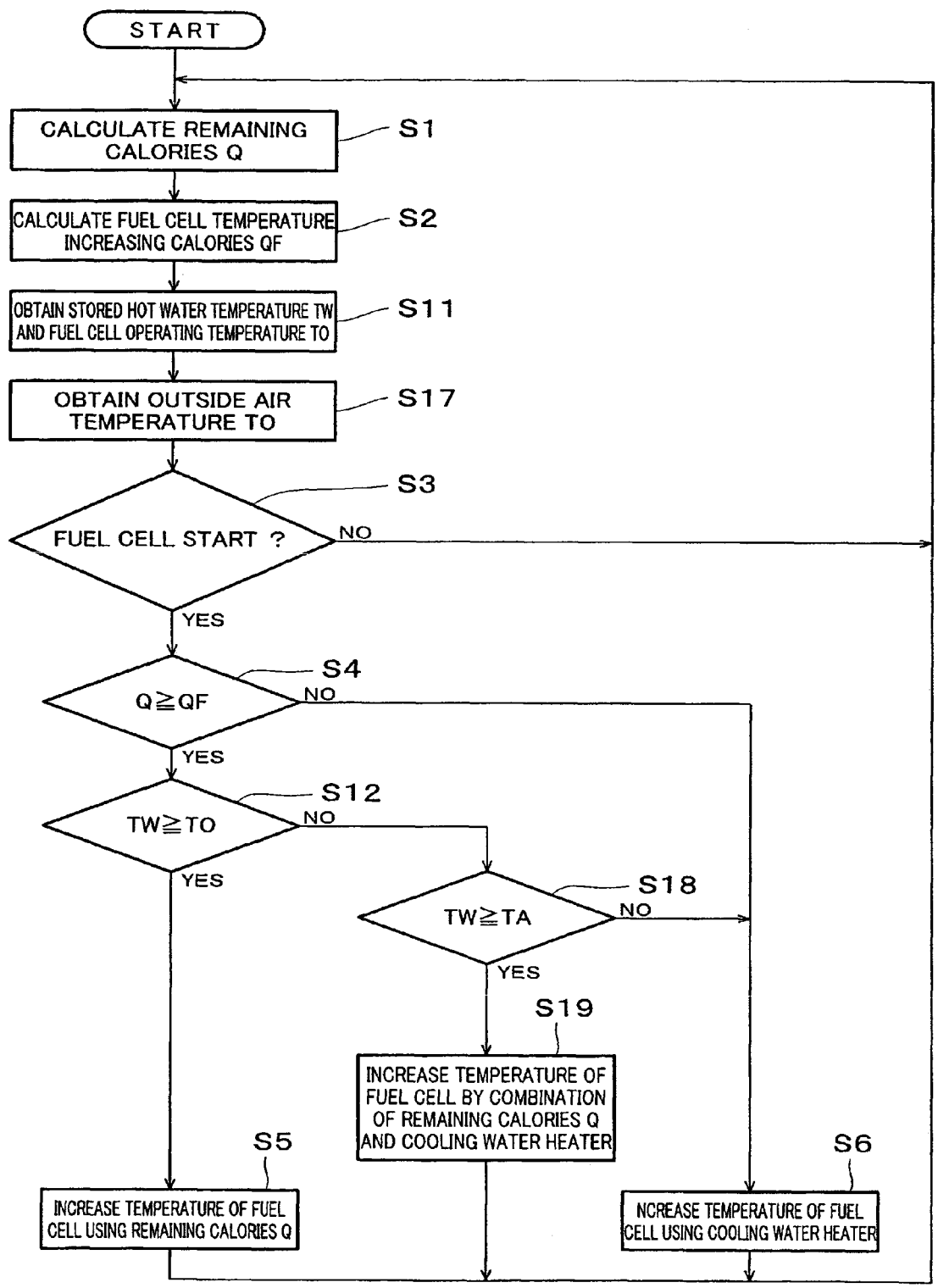
FIG. 15 is a flowchart showing an operation to select a temperature increasing means of a fuel cell cogeneration system according to a fourth embodiment of the present invention.
Figure 16:
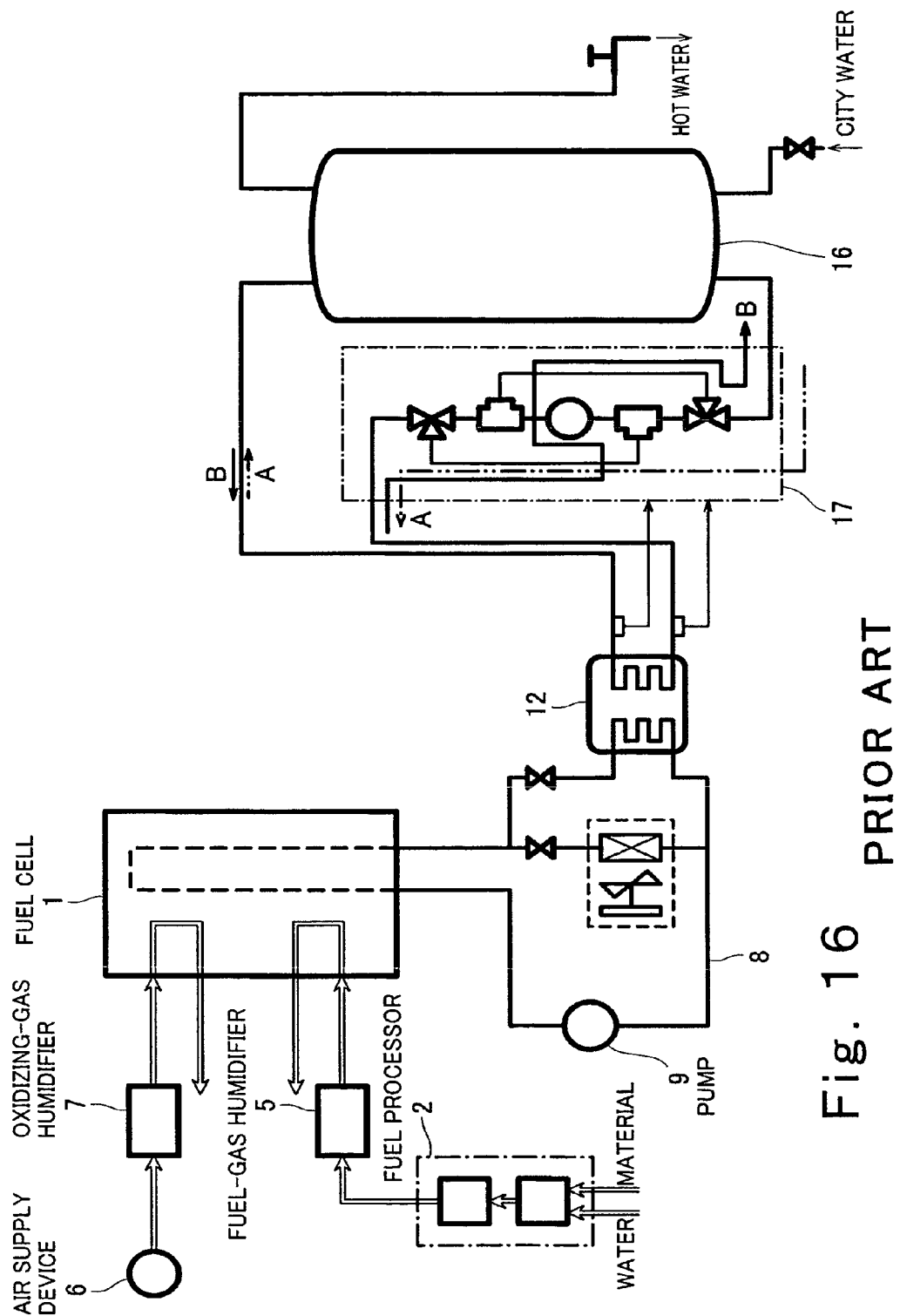
FIG. 16 is a block diagram showing a construction of the conventional fuel cell cogeneration system.

FIG. 15 is a flowchart showing an operation to select a temperature increasing means in the cogeneration system of the fourth embodiment in FIG. 15. In FIG. 15, the same reference numerals as those denote the same or corresponding steps which will not be further described.

Turning to FIGS. 8 and 15, in the fourth embodiment, the processor 105 obtains the stored hot water temperature TW and the fuel cell operating temperature TO in Step S11. Thereafter, in Step S17, the processor 105 converts the signal indicating the detected temperature which is input from the ambient air temperature sensor 106 into ambient air temperature to thereby obtain it.

In Step S4, the processor 105 determines whether or not the remaining calories Q are not less than the temperature increasing calories QF, and if it is determined that the remaining calories Q are less than the temperature increasing calories QF in Step S4, the cooling water heater 100 is used to increase the temperature of the fuel cell 1 (Step S6), whereas when the remaining calories Q are not less than the temperature increasing calories QF in Step S4, the processor 105 advances to Step S12.

In Step S12, the processor 105 determines whether or not the stored hot water temperature TW is not lower than the fuel cell operating temperature TO. If it is determined that the stored hot water temperature TW is not lower than the operating temperature TO, the remaining calories Q are consumed to increase the temperature of the fuel cell 1 (Step S5), whereas when the stored hot water temperature TW is lower than the operating temperature TO in Step S12, the processor 105 advances to Step S18.

In Step S18, the processor 105 determines whether or not the stored hot water temperature TW is not lower than the ambient air temperature TA. If it is determined that the stored hot water temperature TW is lower than the ambient air temperature TA, the cooling water heater 100 is used to increase the temperature of the fuel cell 1. On the other hand, if it is determined that the stored hot water temperature TW is not lower than the ambient air temperature TA, both of (or combination of) the remaining calories Q and the cooling water heater 100 are used to increase the temperature of the fuel cell 1. In that case, for example, the processor 105 first increases the temperature of the fuel cell 1 using the remaining calories Q, and when the stack temperature detected by the stack temperature sensor 202 becomes near the stored hot water temperature TW, the processor 105 stops using the remaining calories Q to increase the temperature of the fuel cell 1. Thereafter, the processor 105 increases the temperature of the fuel cell 1 using the cooling water heater 100.

Embodiment 5

In a fifth embodiment of the present invention, the operation to increase the temperature of the fuel cell 1 of the first to third embodiments is altered as described below.

More specifically, both of the remaining calories Q and the cooling water heater 1 are used to increase the temperature of fuel cell 1 in Step S5 of the operation to select the temperature increasing means of the first to third embodiments. And, the former is mainly employed rather than the latter (a ratio of use the former to the use of the latter is set higher). In addition, in Step S6, both of the cooling water heater 100 and the remaining calories Q are used to increase the temperature of the fuel cell 1. And, the former is mainly employed rather than the latter (a ratio of use the former to the use of the latter is set higher). This ratio is determined based on time allocation or flow rate allocation of the cooling water.

Turning to FIGS. 1, 8 and 13, if this ratio is determined based on the time allocation, the temperature of the fuel cell 1 is increased while switching the use of the remaining calories Q and the use of the cooling water heater 100 so that the remaining calories Q and the cooling water heater 100 are respectively used for time periods according to this ratio.

On the other hand, if this ratio is determined based on the flow rate allocation of the cooling water, the flow rate control valve 13 and the flow rate control valve 14 are opened simultaneously and their open degrees are adjusted so that the cooling water flows through these valves 13 and 14 at flow rates according to this predetermined ratio. And, the cooling water pump 9 and the cooling water heater 10 are operated and the pump 20 is operated, and the circulating direction switch means 17 is controlled so that the hot water circulates in the B direction.

In accordance with this configuration, the effects produced by the first to third embodiments are also substantially obtained in the fourth embodiment. Nonetheless, if the cooling water heater 100 is used when only the remaining calories Q should be used to start the fuel cell 1 in the first to third embodiments, energy efficiency of the cogeneration system is correspondingly reduced. On the other hand, the remaining calories Q are used when only the cooling water heater 100 should be used to start the fuel cell 1 in the first to third embodiments, calories (e.g., amount of supplied hot water) capable of being consumed during the start time period tA are correspondingly reduced.

While the remaining calorie detector 101 is constituted by a plurality of temperature sensors 101A, 101B, and 101C attached to the surface of the tank 16 to be vertically spaced apart from one another in the first to fifth embodiments, this may alternatively be, as shown in FIGS. 1, 8 and 13, constituted by a heat exchanger outlet temperature sensor 18 and a heat exchanger inlet temperature sensor 19 respectively attached to the outlet and the inlet of the heat exchanger 12 (in the flow direction A of hot water), and flow rate meters respectively attached to the pipes 15a and 15b, and the processor 105 may calculate heat recovery calories from the product of difference between temperatures detected by the sensors 18 and 19 and the flow rates of the hot water flowing through the pipes 15a and 15b which are measured by the flow rate meters, and may subtract the consumed calories E from the heat recovery calories.

While the recovered heat is used for hot water supply in the first to fifth embodiments, the present invention is also applicable to a case where the recovered heat is used or air conditioning or drying, and in that case, the same effects are obtained.

While the tank 16 is layered hotwater tank in the first to fifth embodiments, other types may be employed.

While the antifreezing fluid and the water are used as the internal heat transfer medium and the external heat transfer medium, respectively, in the first to fifth embodiments, other heat transfer media may alternatively be used.

While the controller 201 is configured to control the operation of the whole fuel cell cogeneration system and the operation to select the temperature increasing means in the first to fifth embodiments, a plurality of controllers may alternatively be arranged to correspond to a plurality of desired components in the fuel cell cogeneration system, and may operate in cooperation with one another. So, as used herein, the controller refers to a single controller and a group of a plurality of controllers configured to operate in cooperation with one another.

While the controller 201 contains the storage 104 constituted by the internal memory as the storage means in the first to fifth embodiments, data storage medium and data storage medium driver capable of writing and reading out data to and from the data storage medium may alternatively be used as the storage means.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A method of operating a fuel cell cogeneration system, the method comprising the steps of:
    (A) cooling a fuel cell by circulating an internal heat transfer medium through the fuel cell while the fuel cell is generating electric power;
    (B) storing an external heat transfer medium in a heat utilization portion, the external heat transfer medium having recovered heat from the internal heat transfer medium via a heat exchanger provided at an internal passage through which the internal heat transfer medium circulates;
    (C) detecting remaining calories of the heat utilization portion by a first detector provided at the heat utilization portion;
    (D) increasing a temperature of the fuel cell to an operating temperature by carrying out a first temperature increasing operation comprised of increasing the temperature of the fuel cell by circulating, when the remaining calories are at a threshold or more at the time of start-up, the internal heat transfer medium to which the heat is transferred from the external heat transfer medium via the heat exchanger; and
    (E) increasing the temperature of the fuel cell to the operating temperature by carrying out a second temperature increasing operation comprised of increasing the temperature of the fuel cell by circulating, when the remaining calories are less than the threshold, the internal heat transfer medium heated by a heater provided at the internal passage.

2. The method according to claim 1, wherein step (D) increases the temperature of the fuel cell by carrying out the first temperature increasing operation as a main operation and the second temperature increasing operation.

3. The method according to claim 1, wherein step (E) increases the temperature of the fuel cell by carrying out the second temperature increasing operation as a main operation and the first temperature increasing operation.

4. The method according to claim 1, wherein step (D) includes the steps of:
   (D1) detecting a temperature of the external heat transfer medium stored in the heat utilization portion;
   (D2) increasing the temperature of the fuel cell to the operating temperature by carrying out the first temperature increasing operation when the remaining calories are the threshold or more, and the temperature of the external heat transfer medium detected in the step (D1) is the operating temperature or higher; and
   (D3) increasing the temperature of the fuel cell to the operating temperature by carrying out the second temperature increasing operation when the remaining calories are the threshold or more, and the temperature of the external heat transfer medium is lower than the operating temperature.

5. The method according to claim 4, wherein step (D) includes the steps of:
   (D4) detecting an ambient air temperature outside the fuel cell;
   (D5) increasing the temperature of the fuel cell to the operating temperature by carrying out the first temperature increasing operation when the remaining calories are the threshold or more, and the temperature of the external heat transfer medium detected in step (D1) is the operating temperature or higher, and increasing the temperature of the fuel cell to the operating temperature by carrying out both the first temperature increasing operation and the second temperature increasing operation when the remaining calories are at the threshold or more, and the temperature of the external heat transfer medium detected in step (D1) is lower than the operating temperature and equal to or higher than the ambient air temperature outside the fuel cell detected in step (D4); and
   (D6) increasing the temperature of the fuel cell to the operating temperature by carrying out the second temperature increasing operation when the remaining calories are at the threshold or more, and the temperature of the external heat transfer medium is lower than the operating temperature and the ambient air temperature outside the fuel cell detected in step (D4).

6. The method according to claim 1, wherein the threshold includes fuel cell increasing calories required to increase the temperature of the fuel cell to the operating temperature and predetermined calories.

7. The method according to claim 6, wherein the predetermined calories are start time period consumed calories consumed by consumers during a start time period from when the fuel cell starts until a predetermined time elapses.

8. The method according to claim 7, further comprising the steps of:
   (F1) detecting, by a fourth detector, consumed calories of the external heat transfer medium stored in the heat utilization portion and measuring, by a clock, a time at which the consumed calories are detected;
   (F2) storing the detected consumed calories and the measured time; and
   (F3) calculating the start time period consumed calories based on the measured time and the stored consumed calories.

9. The method according to claim 8, wherein step (F3) obtains the start time period consumed calories by calculating an average value of consumed calories for a predetermined period.

10. The method according to claim 8, wherein the predetermined calories include a fixed amount and a correction amount,
    the method further comprising a step (F4) of changing the correction amount based on the start time period consumed calories calculated in step (F3).

11. The method according to claim 6, further comprising the steps of
    (F5) detecting an ambient air temperature outside the fuel cell; and
    (F6) changing the predetermined calories based on the ambient air temperature detected in step (F5).

12. The method according to claim 6, further comprising the steps of
    (F7) detecting the temperature of the external heat transfer medium to be consumed; and
    (F8) changing the predetermined calories according to a frequency at which the temperature of the external heat transfer medium detected in step (F7) is not higher than a predetermined value.

13. The method according to claim 1, wherein:
the external heat transfer medium is water; and
the heat utilization portion is a tank.

14. The method according to claim 13, wherein the tank is a layered hotwater tank.

15. The method according to claim 1, wherein:
step (D) increases the temperature of the fuel cell to the operating temperature only by the first temperature increasing operation; and
step (E) increases the temperature of the fuel cell to the operating temperature only by the second temperature increasing operation.

* * * * *